(12) United States Patent
Gyoten et al.

(10) Patent No.: US 6,372,373 B1
(45) Date of Patent: Apr. 16, 2002

(54) SOLID POLYMER ELECTROLYTE FUEL CELL AND METHOD FOR PRODUCING THE SAME

(75) Inventors: Hisaaki Gyoten, Shijonawate; Kazuhito Hatoh, Daitou; Kazufumi Nishida, Moriguchi; Hideo Ohara, Kadoma; Eiichi Yasumoto, Katano; Teruhisa Kanbara, Ikeda; Makoto Uchida, Hirakata; Yasushi Sugawara, Neyagawa; Toshihiro Matsumoto, Ibaraki; Kouji Nakagawa, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/292,594

(22) Filed: Apr. 16, 1999

(30) Foreign Application Priority Data

Apr. 17, 1998 (JP) ............................................. 10-107611
Apr. 17, 1998 (JP) ............................................. 10-107612
Aug. 20, 1998 (JP) ............................................. 10-234762

(51) Int. Cl.$^7$ ......................... H01M 2/08; H01M 2/14; H01M 8/10
(52) U.S. Cl. ......................... 429/35; 429/32; 429/36; 429/38; 429/39
(58) Field of Search ...................... 429/32–39

(56) References Cited

U.S. PATENT DOCUMENTS

| | | | | |
|---|---|---|---|---|
| 4,125,680 A | * | 11/1978 | Shropshire et al. ............ | 429/4 |
| 4,874,681 A | * | 10/1989 | Rippel ........................ | 429/210 |
| 5,300,370 A | | 4/1994 | Washington et al. .......... | 429/34 |
| 5,460,897 A | * | 10/1995 | Gibson et al. ................. | 429/39 |
| 6,057,054 A | * | 5/2000 | Barton et al. ................. | 429/35 |
| 6,080,503 A | * | 6/2000 | Schmid et al. ................ | 429/35 |

FOREIGN PATENT DOCUMENTS

| | | |
|---|---|---|
| GB | 2323700 A | 9/1998 |
| GB | 2326017 A | 9/1998 |
| JP | 57187874 | 11/1982 |
| JP | 63098970 | 4/1988 |
| JP | 01043974 | 2/1989 |
| JP | 01183071 | 7/1989 |
| JP | 01235165 | 9/1989 |
| JP | 08078028 | 3/1996 |
| JP | 08162143 | 6/1996 |
| JP | 08222237 | 8/1996 |
| WO | 98/33225 | 7/1998 |

* cited by examiner

Primary Examiner—Mark F. Huff
Assistant Examiner—Daborah Chacko-Davis
(74) Attorney, Agent, or Firm—McDermott, Will & Emery

(57) ABSTRACT

A compact solid polymer electrolyte fuel cell having a simplified structure of a high mechanical strength and an improved gas-sealing property is disclosed. In the solid polymer electrolyte fuel cell of the present invention, gas-tight electrically insulating layers are provided on the flanks or the insides of the module of the above-mentioned laminated unit cells, thereby to give a gas-tightness between said electrode and separator.

23 Claims, 16 Drawing Sheets

SOLID POLYMER ELECTROLYTE FUEL CELL AND METHOD FOR PRODUCING THE SAME

BACKGROUND OF THE INVENTION

The present invention relates to fuel cells which operates at room temperature used in portable power sources, power sources for electric vehicles, household cogeneration systems and the like. Further, the present invention relates to a solid polymer electrolyte fuel cell and a method for producing the same, in particular.

The solid polymer electrolyte (hereinafter, referred to simply as "polymer electrolyte") fuel cells allow a fuel gas such as hydrogen to electrochemically react with an oxidization agent gas such as air at their gas-diffusion electrode, thereby to simultaneously generates electricity as well as heat.

An example of this kind of the polymer electrolyte fuel cells is illustrated in FIG. 2.

On both surfaces of a polymer electrolyte film (hereinafter, referred to simply as "electrolyte film") 3, which selectively transports hydrogen ions, catalytic reaction layers 2 consisting mainly of carbon powder carrying a platinum group metal catalyst are arranged in close contact with the film. On the surfaces of the catalytic reaction layers 2, a pair of diffusion layers 1 having both of gas-permeability and electrical conductivity are additionally arranged while being in close contact. An electrode 23 is configured with this diffusion layer 1 and the catalytic reaction layer 2.

On the surfaces of the electrode 23, there are arranged electrically conductive separator 4 in the form of plate for mechanically fixing an electrode-electrolyte assembly 22 composed of these electrodes 23 and electrolyte film 3 (hereinafter, referred to as "MEA") and electrically connecting the adjacent MEAs 22 with each other in series. On the surfaces of the separators 4 in contact with the electrode 23, there are formed gas-flow paths 5 for supplying the reactive gases to the electrodes and exhausting gases generated by the reaction or residual gases. The gas-flow paths 5 may be provided independent of the separator 4, but it is general to provide grooves on the surfaces of separator 4 as the gas-flow paths.

In order to supply the fuel gas to the grooves, it is required to branch a pipeline for supplying the fuel gas into the separators in their numbers and to connect the ends of the branched pipelines directly to the grooves of the separators by means of a piping jig. This jig is referred to as "manifold", and one of the type that connects the pipelines of the fuel gas directly to the grooves is referred to as "outer manifold".

On the other hand, there is also the other type called "inner manifold" whose structure is simple. The inner manifold is configured by providing ports on the separator already having the gas-flow paths and allowing the inlets and outlets of the gas-flow paths to reach to the ports. The fuel gas is supplied through the ports.

On the other surfaces of the separators 4 which are placed in every two cells and not in contact with the MEAs, there are provided coolant-flow paths 24 for distributing cooling water employed for maintaining the cell temperature constant. By distributing the cooling water, thermal energy generated by the reaction may be recovered and utilized in the form of hot or warmed water.

In addition, in order to prevent hydrogen and/or air from leaking outside of the cell or mixing with each other, and in order to prevent the cooling water from leaking outside of the cell, sealants 17 that put the electrolyte film 3 therebetween or O-rings 18 are arranged around the circumference of the electrodes 23. There is also such a case wherein these sealants 17 and O-rings 18 have previously been assembled by combining them with the electrodes 23 and electrolyte films 3 in an integral body.

As another method for the sealing, there is such a structure as shown in FIG. 3, wherein a gasket 19 of a resin or a metal having a thickness of substantially the same as that of the electrode is arranged around the circumference of the electrode and the gaps between the gasket 19 and the separators 4 are sealed with the sealant 17 such as grease or an adhesive.

In recent years, there is proposed an alternative method as shown in FIG. 4, wherein the MEAs configured with the electrodes 23 of the same size as that of the electrolyte film 3 are used. And, a resin 21 which has a sealing effect has previously been impregnated into the portions where the gas-tight sealing are required, thereby to allow the resin to solidify therein. That is, the method of securing the gas-sealing property between the separators 4 by impregnating the resin 21 is devised.

As previously described, many of the fuel cells employ a laminated structure configured by stacking a number of unit cells. In order to exhaust heat generated by the electric power during the fuel cell operation to the outside of the cells, cooling plates are arranged in every 1 to 3 unit cells of the laminated cell. As the cooling plates, one that has such a structure wherein a thermal medium such as cooling water is distributed through a space surrounded by metallic plates is generally employed. As shown in FIG. 2 to FIG. 4, the coolant-flow paths 24 are formed on the rear face of the separator 4, i.e. the surface where the cooling water flows through, thereby to allow the separator 4 itself to function as the cooling plate. In this structure, the O-rings or the gaskets are required for sealing the thermal medium such as cooling water, but in this sealing method, it is necessary to secure a satisfactory electrical conductivity between the top and bottom surfaces of the cooling plates by, for instance, completely pressurizing and deforming the O-rings.

Then, as regards the previously-described manifold, the inner manifold type is generally used that have the gas-supply ports and the gas-exhaust ports for the respective unit cells as well as the supply/exhaust ports for the cooling water inside of the laminated cell. Herein, as an example of the polymer electrolyte fuel cells of the inner manifold type, a partly cut-out perspective view thereof is illustrated in FIG. 5.

As the same as the structure shown in FIG. 2, the diffusion layers 1, the catalytic reaction layers 2, the electrolyte films 3 and separators 4 are laminated, and the gas-flow paths 5 are formed. And, the gas manifolds 8 for supplying/exhausting the gas to/from the cells as well as the cooling water manifolds 8' for supplying/exhausting the water for cooling the cell are also formed in the laminated structure.

In the case of operating the cell of such inner manifold-type by the use of a reformed gas, however, the electrode is poisoned to decrease the temperature of the cell as the result of increase in the concentration of carbon monoxide at the down streams of the fuel gas-flow paths in the respective unit cells. And the decrease in the temperature further facilitates the electrodes to be poisoned.

In order to suppress such decrease in the cell performance, the outer manifold-type is now also attracting attention again whose structure capable of securing a width of the gas supplying and exhausting portions from the manifold to the respective unit cells as largely as possible.

In the case of the fuel cells of the inner manifold type, the reliability on the gas-sealing property is high in general because a squeezing or tightening (binding) pressure is constantly added onto the whole cell structure. In contrast, in the case of the fuel cells of the outer manifold type, it is relatively hard to obtain an even and flat sealing face because the flanks (side faces) of the laminated unit cells that are in contact with the flange of the manifold are a laminated body composed of the thin sheets such as MEAs and separators. That is, the outer manifold type in general has a lower reliability as compared with the inner manifold type.

In the case of the inner manifold type, however, when the lamination number and the output power of the fuel cell are increased, a large quantity of fluid must be supplied and exhausted through the ports of the inner manifold. Thus, a pressure loss in the manifold increases. It is, therefore, required to make the manifold ports have a smaller diameter in the fuel cell which has a small lamination number by considering the compactness of the whole cells, and conversely, to make the manifold ports have a larger diameter in the fuel cell which has a large lamination number in order to suppress the pressure loss. For that reason, in the inner manifold system, there has been a problem that the lamination number should be considered in the design of the separators and the MEAs.

In any case, it is required to stack a number of the unit cells with cooling portions up in one direction, to arrange a pair of end plates on the both end of the stacked body, and to fix the stacked body by connecting the two end plates with binding rods. As a system for squeezing, it is desirable to squeeze the unit cells as uniformly as possible with respect to their planes, and it is usual to use a metallic material such as stainless steel or the like for the end plates and the binding rods in viewpoint of mechanical strength. These end plates and binding rods are electrically insulated from the laminated unit cells by insulation plates or the like and used in a structure whereby any current will not leak outside through the end plates. As regards the binding rods, there are proposed a modified system whereby the binding rods are guided through ports provided on the separator plates and another system of squeezing the laminated unit cells as a whole with metal belts over the end plates.

In addition, in any of the sealing methods shown in FIG. 2 to FIG. 4, it is necessary to apply a constant pressure for maintaining the sealing property and keeping the contact resistance between the electrodes and the separators small and, thus, such a configuration is employed wherein screw springs or dish washer is inserted between the binding rods and the end plates. With this squeezing pressure, the electrical contact between the members such as separators, electrodes, electrolyte films and the like is also secured.

On the other hand, the separators in the described polymer electrolyte fuel cells are required to have a high electrical conductivity, a high gas-tightness to the fuel gas and a high corrosion resistance against the reaction product generated at the time of oxidizing/reducing of hydrogen and oxygen. For these reason, the conventional separators are configured with a carbon material such as glassy carbon, expanded graphite or the like. The gas-flow paths are formed by means of machine tool cutting and, in the case of the expanded graphite, by molding with a die.

In recent years, however, plates of metal such as stainless steel or the like have been used in place of the conventional carbon material. FIG. 6 and FIG. 7 show schematic plan views of a conventionally used separator, respectively. As shown by FIG. 6, by providing ribs 6 of a resin material or the like on the circumferential parts of the separator 4 and around the circumferences of the ports of the inner manifolds and by inserting, for instance, a metallic mesh 7 or a corrugated fin between the electrode and the metallic plate, the gas-flow paths are formed. Alternatively, as shown by FIG. 7, one system may be considered that by pressing a metallic plate to have concaved portions 9 and convex portions 10, the gas-flow path is formed with the concaved portions 9 which connects the ports of the gas supply side with the ports of the gas exhaust side in the manifold.

For the fuel cells illustrated in the above, there is a need for arranging the sealants or the O-rings around the circumference of the electrode for preventing the gas such as hydrogen or air from leaking. At that time, the MEA is required to have a margin as wide as about 10 mm for providing the sealant. In a method of allowing a resin having a sealing effect to impregnate into the MEA to provide the sealing portion, a margin as wide as about 0.5 mm is also required.

For realizing a smaller size, a more compactness and a further reduction in the occupied space of the fuel cell, it is required to make these margins for the sealing as small as possible. In addition, the sealants or the sealing portions are required to be sandwiched by separators from the top and bottom, and a relatively large squeezing pressure must be constantly applied. For that reason, the sizes and weights of the squeezing jigs such as the end plates and the binding rods increase, and are the problems for realizing the compactness and the lighter weight of the whole cells.

According to the method of using the sealants or the O-rings, or the method of sealing by impregnating the resin into the MEA, there is a need for the number of the steps for the sealing and, thus, a further inventive means has been desired. In addition, although a satisfactory pressure is required to be maintained between the electrolyte films and the electrodes, and between the electrodes and the separators in the polymer electrolyte fuel cells, there is also a problem that it is difficult to control the thickness for applying the satisfactory pressure because the squeezing pressure between both end plates also acts on the both of the electrodes and the sealing portions.

For the fuel cells of the inner manifold type having a small lamination number, it is required to make the ports of the manifold have a small diameter by considering the compactness of the obtained fuel cell as a whole. On the other hand, for the fuel cells having a large lamination number, it is required to make the ports of the manifold have a large diameter in order to suppress or reduce the pressure loss. That is, there is a problem that in designing the separator and the MEA, the lamination number must be a constant concern.

In view of the above-mentioned unsolved problems, the present invention has an object of providing a polymer electrolyte fuel cell which has an excellent gas-sealing property between the above-mentioned manifold and the surface of the module of the laminated unit cells. The present invention also has another object of providing a method for producing the same.

According to the conventional method of producing the separator plate by means of cutting the carbon plate, it is difficult to reduce the material cost of the carbon plate and the cost for cutting the plate. According to the method of using the expanded graphite, the material cost is also expensive. And, thus, these methods are believed to be an obstacle to putting them into practice.

Alternatively, according to the above-mentioned method of using the metallic plate in the case of the separator shown in FIG. 6, when the amount of the flowing gas is reduced and the utilization of the gas is raised for the purpose of reducing the energy required for supplying the gas, the flow rate of the fuel gas at the surface of the electrode becomes small. Thus, the exhaustion of the produced water vapor is made difficult. In addition, it is difficult to cause the gas to flow uniformly between the supply side and the exhaust side of the manifold.

According to the separator illustrated in FIG. 7, it is however possible to maintain the gas-flow rate and to flow the gas uniformly. In this structure, however, the sealing for the fuel gas is difficult because the end faces of the manifold inevitably is in corrugated structure. In addition, there is a number of limitations on the processing of the metallic plate, and it is difficult to design the gas-flow path free.

It is therefore an object of the present invention to also provide a separator that can solve these problems.

BRIEF SUMMARY OF THE INVENTION

The present invention provides a solid polymer electrolyte fuel cell comprising a plurality of unit cells laminated while placing electrically conductive separators therebetween, said unit cell comprising an electrode having a pair of catalytic reaction layers which sandwich a solid polymer electrolyte film therebetween, a means for supplying and distributing a fuel gas mixture containing hydrogen to one surface of the above-mentioned electrode, and a means for supplying and distributing an oxidant gas containing oxygen to the other surface of the above-mentioned electrode, wherein gas-tight and electrically insulating layers are provided on the flanks or the insides of the laminated unit cells, thereby to give a gas-tightness between the electrode and separator.

It is preferable that the electrically insulating layers comprise a composite material configured with the above-mentioned electrically insulating material and a material having a larger tensile strength than the insulating material, for the covering purpose.

It is also preferable to provide a gas manifold on the flanks of the module of the above-mentioned laminated unit cells via the above-mentioned electrically insulating layer, thereby to supply and distribute the fuel gas to the unit cell module.

In addition, it is preferable that the edges of the electrodes of said unit cells reach the flanks of said module of the laminated unit cells.

Further, it is preferable that the above-mentioned gas manifold is composed of an elastic material.

In addition, it is preferable that the material for constituting the above-mentioned gas manifold is the same as that consituting the above-mentioned electrically insulating layers.

Further, it is also preferable that the above-mentioned electrically insulating layers comprise a resin or a rubber.

In addition, it is preferable that the above-mentioned separator is composed of a metallic plate having a gas-distributing groove, and that the above-mentioned gas-distributing groove is connected to the means for supplying and distributing the above-mentioned fuel gas by a gas-tight material.

Further, it is also preferable that the above-mentioned gas-distributing groove is composed of a plurality of linear grooves disposed in parallel with each other.

In addition, it is preferable that the above-mentioned gas-distributing groove formed on one surface of the metallic plate forms a concave part for a gas-distributing groove on the other surface of said metallic plate.

Further, it is also preferable that the above-mentioned separator is composed of a plurality of metallic plates and that a gas-distributing groove is provided on the entire surface of at least one of the metallic plates.

In addition, it is preferable that when the above-mentioned gas-tight non-metallic material is pressed against the metallic plate with a pressure of not less than a given value, the surfaces of the metallic plate in contact with the gas-tight non-metallic material have a gas-tightness to said fuel gas.

In addition, the present invention also provide a method for producing a solid polymer electrolyte fuel cell comprising a plurality of unit cells laminated while placing electrically conductive separators therebetween, said unit cell comprising an electrode having a pair of catalytic reaction layers which sandwich a solid polymer electrolyte film therebetween, a means for supplying and distributing a fuel gas mixture containing hydrogen to one surface of the above-mentioned electrode, and a means for supplying and distributing an oxidant gas containing oxygen to the other surface of the above-mentioned electrode, comprising the steps of:

laminating a plurality of the unit cells via separators therebetween and mechanically binding and fixing the plurality of the unit cells from the both ends to produce the laminated unit cells, forming sealing portion comprising a gas-tight and electrically insulating material or a composite of said electrically insulating material and a material having a larger tensile strength than the electrically insulating material on the flanks of the laminated unit cells, and providing gas manifolds on the above-mentioned laminated unit cells via the sealing portions to join the above-mentioned sealing portions on the above-mentioned manifolds gas-tightly.

In the case of this method, it is preferable to join the above- mentioned sealing portions on the gas manifolds by means of ultrasonic welding.

Further, by molding the above-mentioned laminated unit cells and the gas manifold into an integral body by means of injection molding process, the gas manifolds may be provided on the laminated unit cells via the sealing portions between them to join said sealing portions on said manifolds gas-tightly.

In addition, in the above-mentioned separator, the gas-distributing grooves on the separator may be formed by means of pressing or folding process on a metallic plate.

Further, the above-mentioned separator may also be produced by first forming a corrugated pattern on the entire surface of a metallic plate by means of pressing or folding to form the gas-distributing groove having a plurality of linear grooves disposed in parallel with each other and, then, by flattening a part of the above-mentioned metallic plate having the corrugated pattern.

In addition, it is also possible to integrate the gas-sealing material with the metallic plate having the gas-distributing grooves by an adhesion or glazing of the material on the metallic plate.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
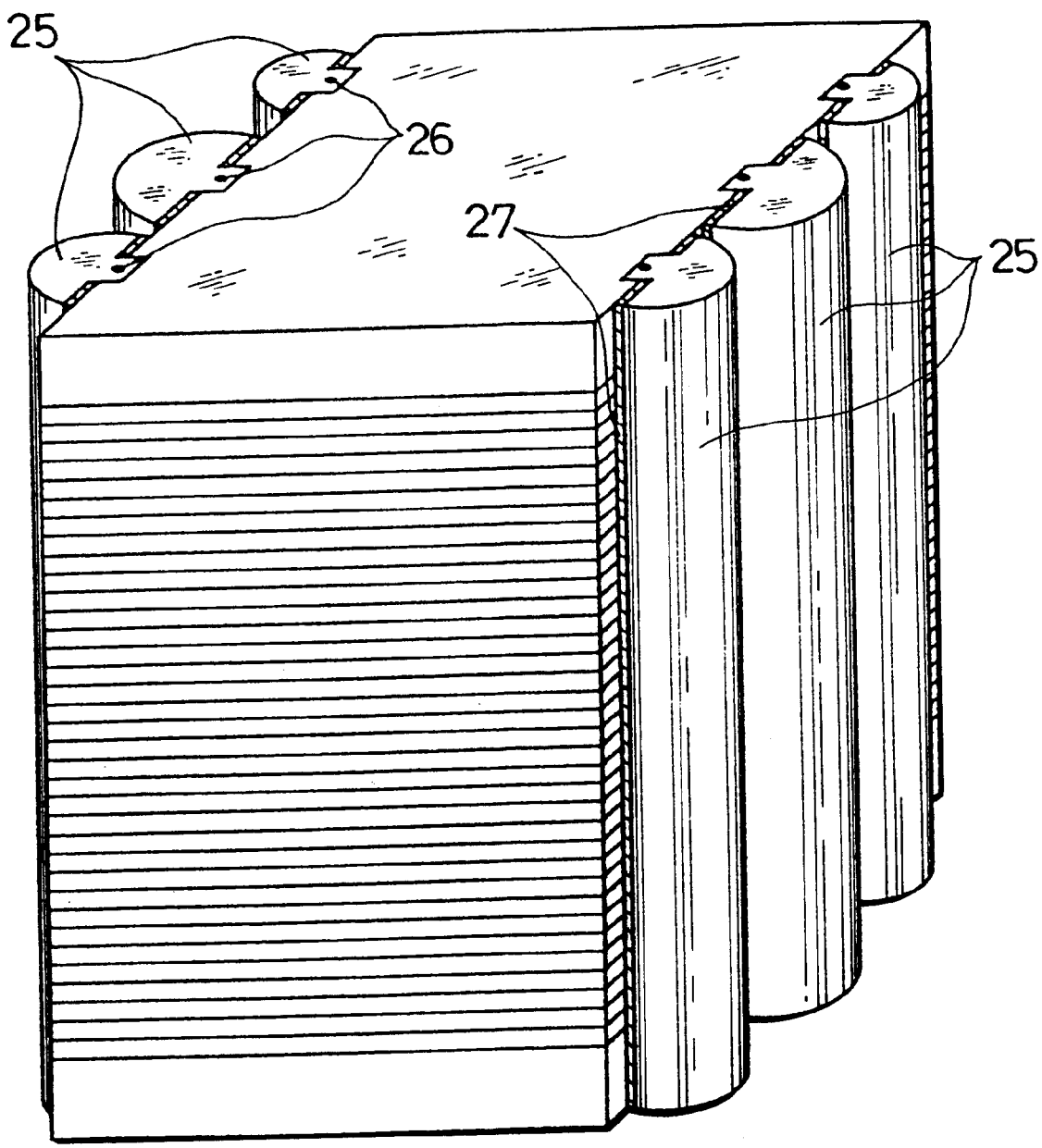
FIG. 1 is a schematic perspective view of the polymer electrolyte fuel cell in accordance with an embodiment of the present invention.
Figure 2:
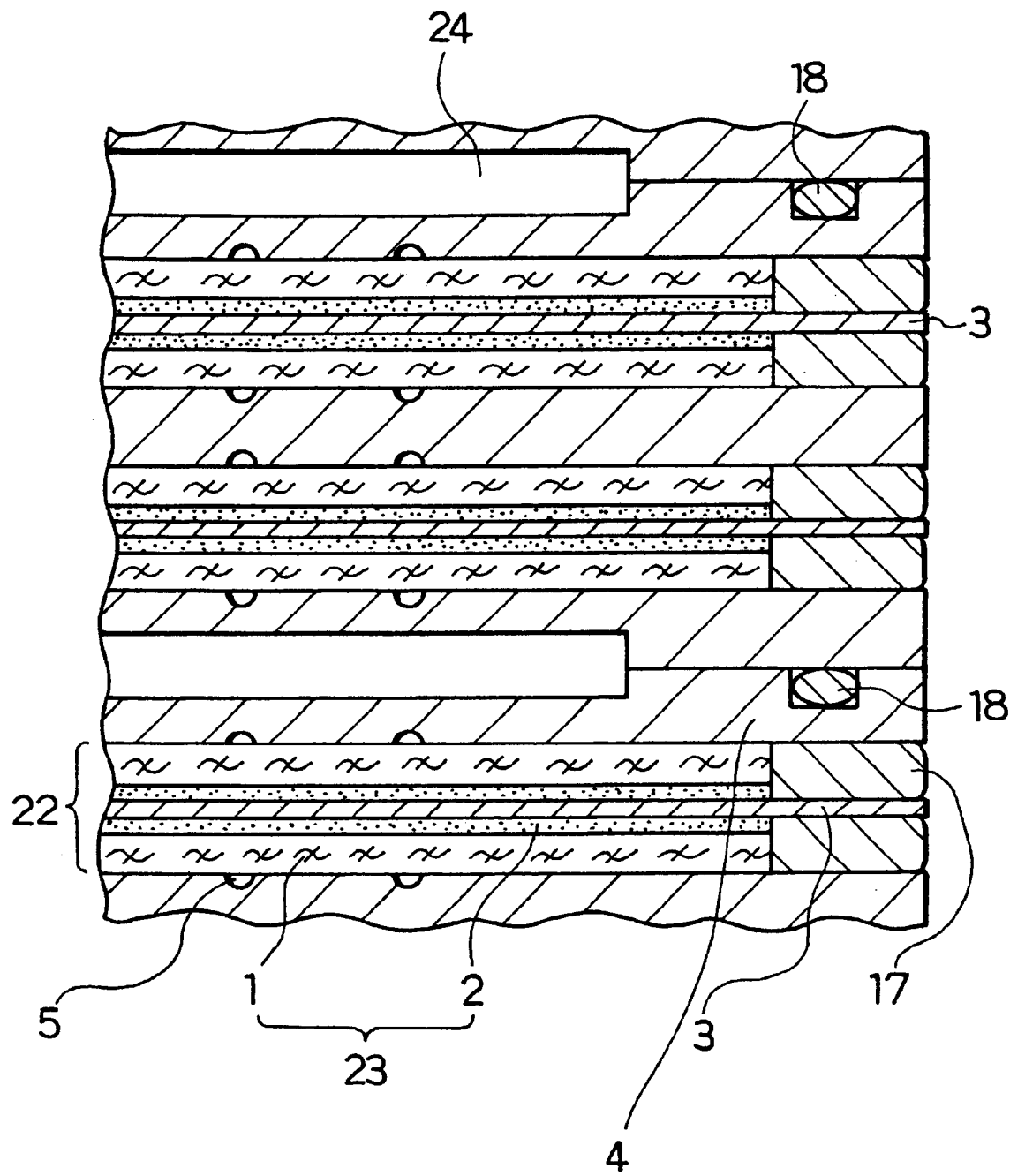
FIG. 2 is a part schematic cross-sectional view showing a structure of a conventional polymer electrolyte fuel cell.
Figure 3:
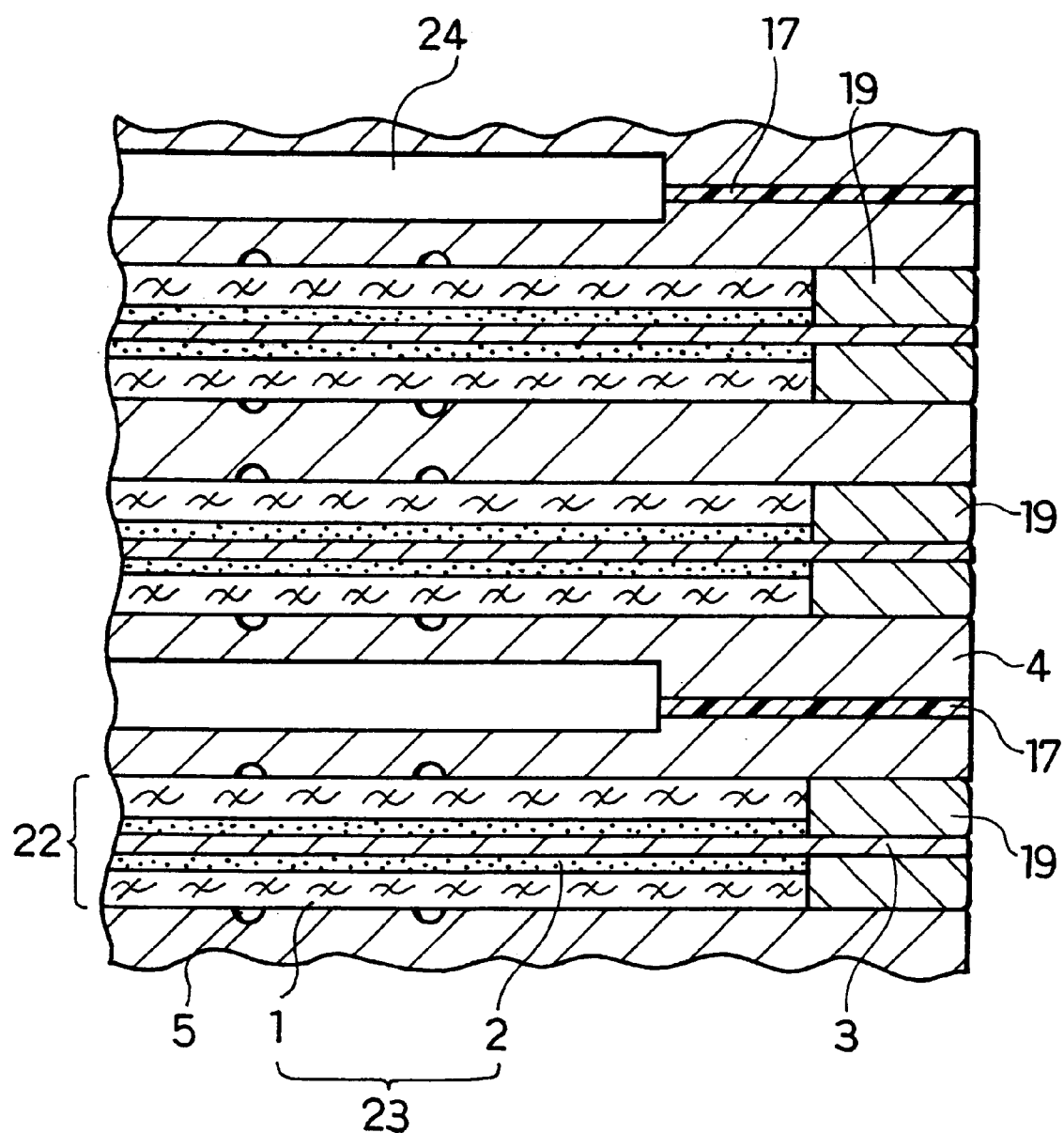
FIG. 3 is a part schematic cross-sectional view showing a structure of another conventional polymer electrolyte fuel cell.
Figure 4:
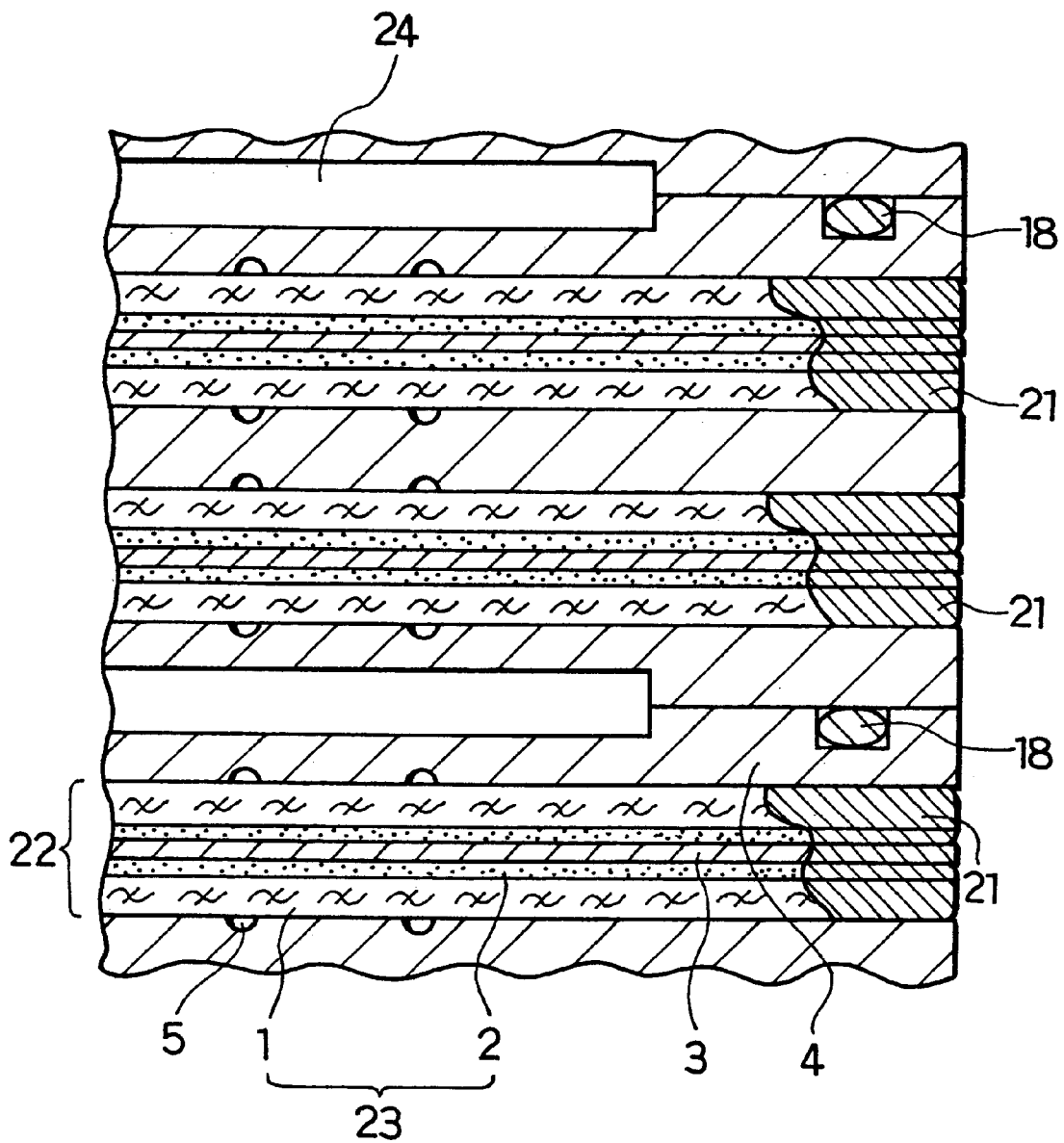
FIG. 4 is a part schematic cross-sectional view showing a structure of a still other conventional polymer electrolyte fuel cell.

The present invention comprises such a sealing method that arranges the sealants on the flanks (side faces) of the cell constituting members such as separators and the like in stead of the conventional sealing method of inserting the sealants between the cell constituting members. In addition, this method removes the sealing portions or the sealing members surrounding the electrodes of the MEA (electrode-electrolyte assembly), and fundamentally configures the electrodes having the same surface areas as the separators. Further, on the sealants arranged around the flanks of the laminated unit cells, fabric material or the like having a larger tensile strength than the sealants is provided. In addition, the polymer electrolyte fuel cell of the present invention may be manufactured by producing, as its manufacturing units, an electrode lamination portion including the separators and the MEAs, and a manifold portion whose design differs depending on the lamination number and the power output of the cell, respectively.

The polymer electrolyte fuel cell in accordance with the present invention gives a gas-sealing property to the fuel cell by covering the flanks (side faces) of the laminated unit cells which is configured by stacking a plurality of unit cells each comprising the cell constituting members such as solid polymer electrolyte film, electrodes having the catalytic reaction layers, separators, and the like, with an electrically insulating material (hereinafter, referred to also as "sealant") having a gas-tightness. In addition, the fuel cell is made to have a compact configuration as a whole by the present invention, because the sealant which had been surrounding the circumference of the electrode in the MEA is dispensed with, and it is possible to extend the electrode to the side faces of the laminated unit cells.

In addition, in stead of using only the sealnt for covering the side faces of the laminated unit cells, the sealant may be covered or composited with a material such as a fiber, a woven fabric, a non-woven fabric, a mesh or the like which has a larger tensile strength than the conventional sealant to obtain a composite material. And, by using this composite material for the sealants, the respective cell constituting members may be mechanically combined at the circumferences of the respective cell constituting members by means of the composite material. Thereby, the necessary binding force to be applied onto the both end plates of the laminated unit cells can be reduced to its minimum.

When the sealants are arranged around the circumferences of the laminated unit cells, a so-called outer manifold structure wherein the electrodes laminated section is separated from the manifold sections is realized with ease. And it is possible to divide the manufacturing unit into the electrodes laminated sections comprising the MEAs and the separators and the manifold sections whose design differs depending on the lamination number and the cell power output. Accordingly, it is possible to reduce manufacturing cost.

In addition, according to the method of the present invention for producing the cell, the manufacturing steps are greatly simplified in a manner of stacking and fixing the cell constituting members such as MEAs and separators while positioning them to align accurately and, thereafter, painting or coating a resin or the sealant on the flanks of the laminated unit cells.

Further, the polymer electrolyte fuel cell in accordance with the present invention is configured by providing the gas manifold on the cell constituting members via the above-mentioned gas-tight and electrically-insulating material between them. When such a configuration is adopted, it is made possible to even or flatten the flanks of the laminated unit cells which are in contact with the sealing surfaces of the outer manifolds to improve the gas sealing property between the outer manifold and the flanks of the laminated unit cells.

In this structure, when the above-mentioned gas manifold is configured with an elastic material, the elastic material absorbs a creep which may develop in the laminated unit cells in their thickness direction and also absorbs unevenness of the flanks of the laminated unit cells in contact with the sealing surfaces of the outer manifold. Thereby, the gas sealing property between the outer manifold and the flanks of the laminated unit cells can be improved.

In addition, when the gas-tight and electrically insulating material comprises a thermosetting resin such as silicone resin or phenolic resin, a thermoplastic resin or a rubber such as silicone rubber or butadiene rubber, or the like, it is possible to maintain the electrically insulating property and thus is preferable.

In particular, in the case of using an elastomer, it absorbs a creep which may develop in the laminated unit cells in their thickness direction and also absorbs unevenness of the flanks of the laminated unit cells in contact with the sealing surfaces of the outer manifold, and thus it is convenient because an overall reliability of the sealing can be improved.

In addition, when a material comprising the above-mentioned gas manifold and the above-mentioned gas-tight and electrically insulating material are the same, the joining between the outer manifold and the flanks of the laminated unit cells in contact with the manifold will not be damaged by the difference in the expansion coefficient. Thus, it is preferable for improving the sealing property between the outer manifold and the flanks of the laminated unit cells.

The method for producing the polymer electrolyte fuel cell in accordance with the present invention is preferable for improving the sealing property between the outer manifold and the flanks of the laminated unit cells. This is because the method includes the step of gas-tightly joining the outer manifold and the electrically insulating material. In particular, if this step is performed by means of ultrasonic welding, it is preferable because the joining property is further improved.

In addition, if the flanks of the laminated unit cells and the outer manifold are molded into an integral body by means of injection molding, it is preferable for improving the sealing property between the outer manifold and the flanks of the laminated unit cells, because joining planes among the both members disappears.

Figure 7:
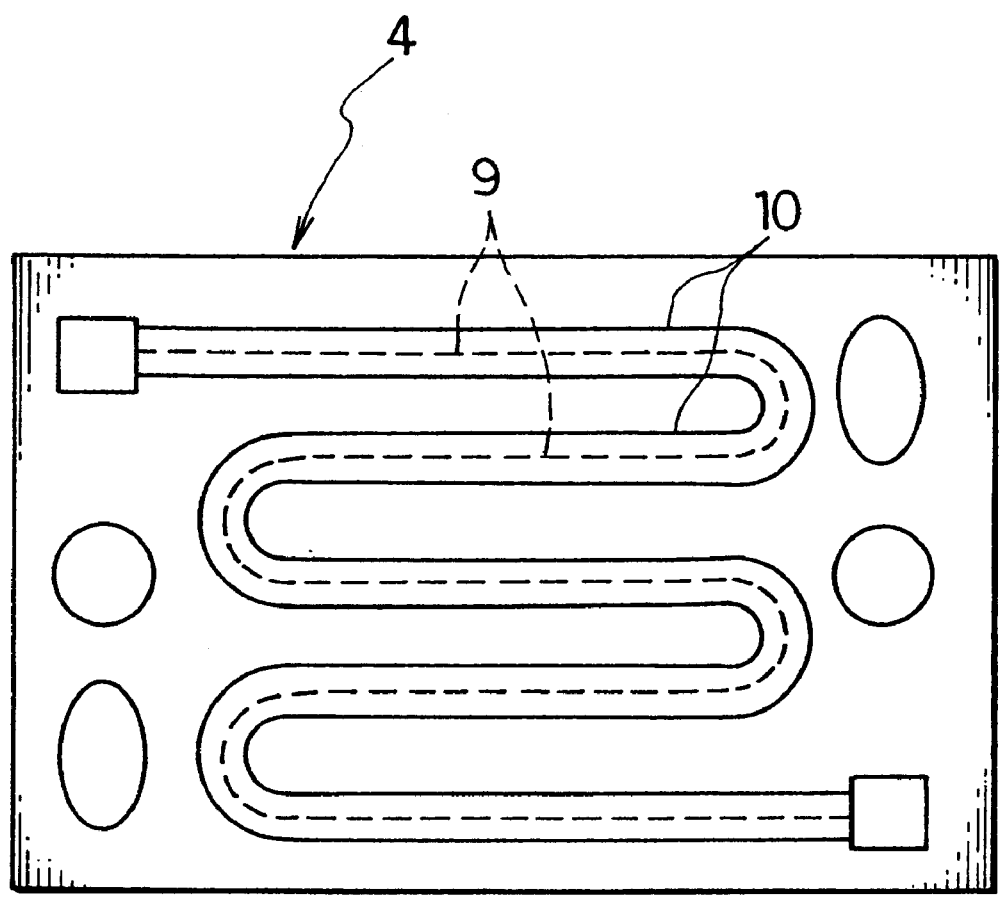
FIG. 7 is a schematic plan view showing a structure of another conventional metallic separator plate.

Then, in order to solve the above-mentioned problems, the present invention has made a great modification on the separators directed to a structure shown in FIG. 7. That is, although the gas-distributing grooves are formed by means of pressing to be the flow paths, the manifold portions are flattened. And, gas-distributing grooves which connects the gas-distributing grooves formed by pressing to the manifold portions, comprises a gas-tight non-metallic material. This gas-tight non-metallic material may be the same as the above-mentioned gas-tight and electrically insulating material.

A plurality of substantially parallel linear sections of the gas-distributing grooves formed by processing the metallic plate are connected with each other by means of carved or bent gas-distributing grooves comprising the gas-tight and non-metallic material. Also, the gas flow paths may be formed by a method other than cutting on the entire surface of one of the metallic plates that constitutes the separators, and the gas-distributing grooves and the convex portions comprising the above-mentioned non-metallic material on the other one flat and even metallic plate. Namely, the separators may be composed of the metallic plates with the gas flow paths and the metallic plates with the gas-distributing grooves and the convex portions of the non-metallic material.

Alternatively, another method may also be adopted wherein the hydrogen gas-distributing grooves and the gas flow paths are formed on the both surfaces of one separator in a manner of forming the gas-distributing grooves on the both surfaces of a single metallic plate by means of plastic deformation.

In addition, a still other method for forming the gas-distributing grooves on only one portion of a metallic plate may also be adopted. In this case, a corrugations are formed on the entire surface of the metallic plate by a method such as embossing other than the machine tool cutting and, then, sections that require a flatness or evenness such as the circumferential gas sealing portions are flattened by means of pressing or other process.

Further, when the gas-tight non-metallic material which forms the gas-distributing grooves is compressed, the material performs gas sealing property on its compressed planes. And, the gas distributing grooves formed with the gas-tight non-metallic material may be substantially integrated with the metallic plate.

Any of the separators used in the polymer electrolyte fuel cell in accordance with the present invention is configured by pressing, embossing or the like a flat metallic plate of stainless steel or the like and providing with the gas distributing grooves of the gas-tight non-metallic material. Thereby, the material cost is small and the processing cost is by far small because the mass-producibility is excellent.

If it is intended to maintain the utilization rate of the supplied fuel gas high and the gas flow rate high, the gas-distributing grooves must be narrow and the cross-sectional area thereof must be small. For that reason, however, if a corrugated structure is formed on the metallic plate for configuring the gas-distributing grooves, the end faces of the manifolds have the corrugated structure according to the gas-distributing grooves. This structure is problematic in maintenance of gas-sealing property at the manifold portions when the laminated unit cells is formed.

For that reason, according to the present invention, the electrical conductivity between the electrodes and the separators is maintained by configuring the gas-distributing grooves at the central part of the separator where the major portion of the electrode is in substantial contact by forming the corrugation structure on the metallic plate. On the other hand, the parts of the metallic plate around the manifold ports are left flat or even and the gas-distributing grooves are formed with the gas-tight non-conductive material such as a resin at that parts. Thereby, it is possible to maintain the gas-sealing property at the end portions of the manifolds.

It is further highly problematic to form a winding gas-distributing grooves by means of pressing process, because kinds of available paterns are limited and there is left stress in the metallic plate after molding. Therefore, the gas-distributing grooves formed on the metallic plate are made to a plurality of linear and parallel grooves in the present invention. In addition, at the ends of the grooves in contact with the circumferential part of the electrode, the gas-distributing grooves having a curved pattern are formed with a resin or the like to connect the adjacent linear grooves thereby to maintain the gas flow rate higher at the same gas utilization rate. Further, it is possible to make the gas flow rate variable by changing the design of the curved grooves of the resin.

In addition, if it is intended to form a number of grooves at a part of one metallic plate, the kind of available pattern to be formed is limited. For that reason, as the metallic plate on which the gas-distributing grooves are formed, a plurality of metallic plates previously subjected to embossing or the like to have the corrugation are used and finally combined. According to this manufacturing process, the problems on the process are greatly reduced.

Moreover, according to the structure comprising the gas-distributing grooves provided on parts of the both faces of a metallic plate obtained by subjecting the metallic plate to the embossing, it is possible to make the thickness of the separator thinner up to a sum of the thickness of the gas-distributing grooves on the one side and the thickness of the metallic plate, because the structure allows the convex parts or ridges on the one side, which separate the adjacent grooves, to function as the gas-distributing grooves on the other side of the matallic plate.

In addition, the material for configuring the gas-distributing grooves has sealing property by pressure-welding. Therefore, if the gas-distributing grooves are integrated with the metallic plate, a separate sealant is not required to be arranged and the assembly of the laminated unit cells becomes greatly easy.

DESCRIPTION OF THE PREFERRED EMBODIMENTS

In the following paragraphs, the preferred embodiments of the present invention will be described in more specificity with reference to the attached drawings, but the present invention should not be limited thereto.

EXAMPLE 1

By immersing a carbon powder having a particle size of not larger than several microns in an aqueous solution of chloroplatinic acid and the carbon powder was caused to carry a platinum catalyst on the surfaces of the respective particles by reduction process. In this process, the ratio by weight of the carbon to the carried platinum was 1:1. Next, this carbon powder carrying the platinum was dispersed in an alcoholic solution of a polymer electrolyte, thereby to obtain a slurry.

Separate from this, a carbon paper with a thickness of 400 μm for the diffusion layer of the electrode was impregnated with an aqueous dispersion of a fluorocarbon resin (Neoflon ND 1 available from DAIKIN INDUSTRIES, Ltd.) and thereafter dried and thermally treated at 400° C. for 30 minutes to have water-repelling property. Next, by painting the above-mentioned slurry containing the carbon powder uniformly on one surface of the above-mentioned carbon paper which had been subjected to the water-repelling treatment to form a catalytic reaction layer, an electrode was obtained.

Figure 5:
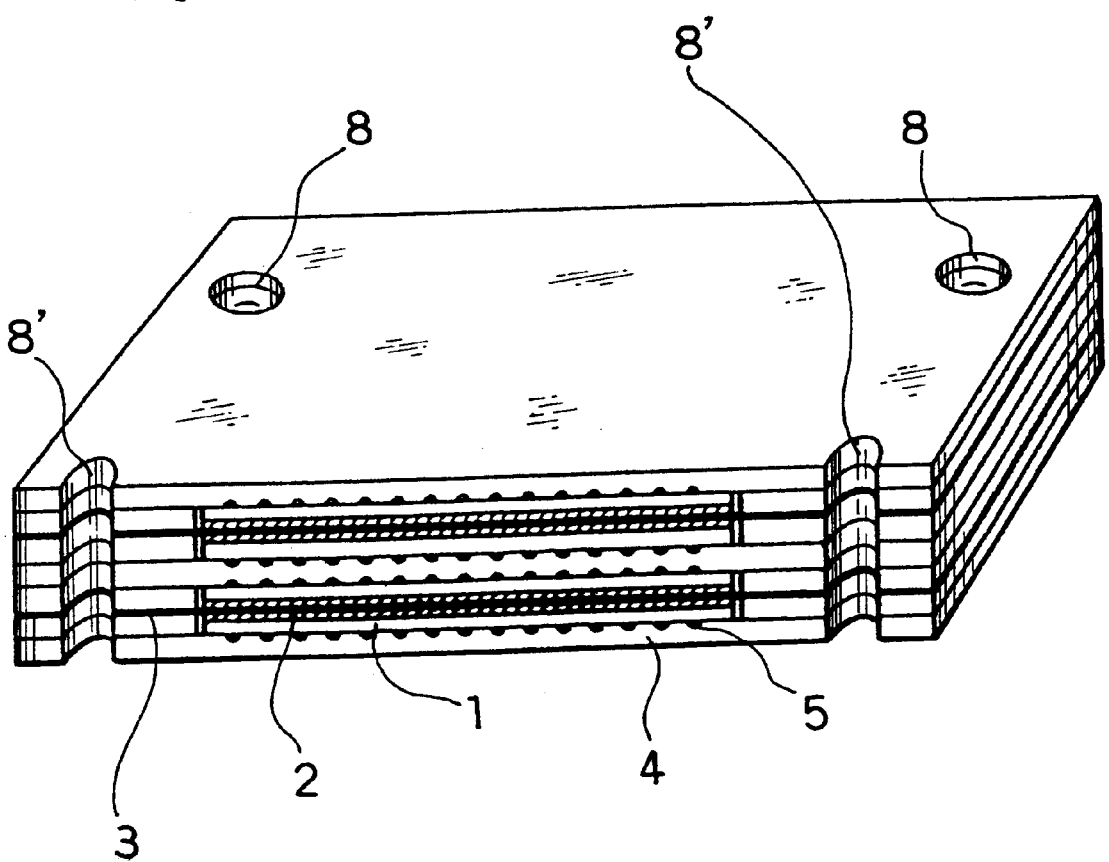
FIG. 5 is a partly cut-out perspective view of a polymer electrolyte fuel cell of an inner manifold system.
Figure 6:
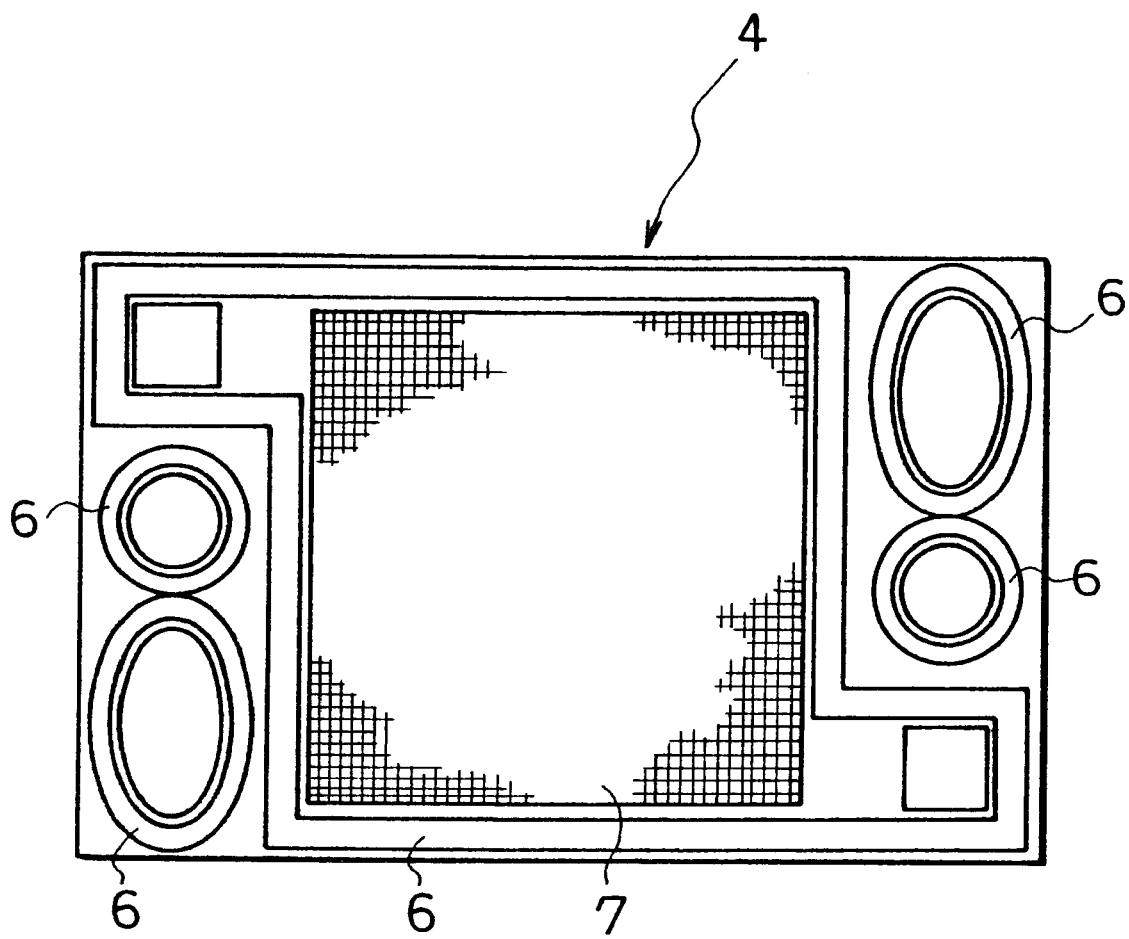
FIG. 6 is a schematic plan view showing a structure of a conventional metallic separator plate.

After sandwiching an electrolyte film 3 with a pair of the carbon paper electrodes prepared in the above-mentioned manner while directing their faces with the catalytic reaction layers 2 inward in compliance with the structure shown by FIG. 5, the stacked body was dried. The carbon paper had a length and a width of 10 cm and was arranged on the center of the electrolyte film 3 having a length and a width of 12 cm. By arranging a pair of silicone rubber sheets having a thickness of about 350 μm as sealants between the electrodes and the electrolyte film 3 in order to prevent the fuel gas from leaking or mixing with the oxidant gas, and subjecting the stacked body to a hot pressing process at 100° C. for 5 minutes, a MEA was obtained.

A unit cell was configured by sandwiching this MEA with a pair of separators 4 made of carbon.

The separator 4 had a thickness of 4 mm and, on its surface, gas-flow paths 5 having a width of 2 mm and a depth of 1 mm were formed by means of machine tool cutting and, on its circumferential part, there were arranged ports 8 for the gas manifold and ports 8' for the cooling water manifold. At the time of sandwiching the MEA with the separators, a pair of polyethylene terphthalate (PET) sheets having the same outer size as the carbon separators 4 were arranged around the electrodes. These PET sheets were used as spacers between the carbon separators and the electrolyte film. After stacking two such unit cells, a cooling unit configured by forming a coolant flow path through which the cooling water flows on another separator was stacked thereon, and this pattern of stacking was repeated to laminate. In this case, no O-ring was used for sealing in the cooling units.

After laminating 50 cells, each comprising two unit cells, each one pair of current collectors, electrical insulation plates and ends plates were arranged on the both ends of the laminated body, which was then fixed by squeezing between the end plates with binding rods. The binding pressure applied at that time was 10 kgf/cm$^2$ for the unit area of the separator. Although the fuel gas and the cooling water were distributed through the obtained module of 50 cells, the expected cell performance was not able to be obtained because these fluids were leaked through the gaps between the PET sheets and the separator plates.

In accordance with this example, a solution prepared by dissolving a phenolic resin powder in an organic solvent was painted on the flanks of the module of 50 cells and allowed to solidify after being dried. The phenolic resin was also painted on the interior surfaces of the manifold by injecting the phenolic resin solution into the manifold through the fluid inlet and outlet ports provided on the end plates and then drying.

A cell performance test was conducted on this module of 50 cells by distributing hydrogen, air and cooling water. The obtained cell output was 1050 w (30A–35 V) under the conditions of a hydrogen utilization rate of 70%, an oxygen utilization rate of 20%, a temperature of hydrogen humidifying bubbler of 85° C., a temperature of oxygen humidifying bubbler of 75° C., and the cell temperature of 75° C.

During the test, no gas leaking and cooling water leaking to the flanks of the laminated unit cellss and to the interiors of the manifolds were observed. No adverse influence on the cell performance was observed even if the binding pressure at the assembling process was reduced to 5 kgf/cm$^2$.

Figure 8:
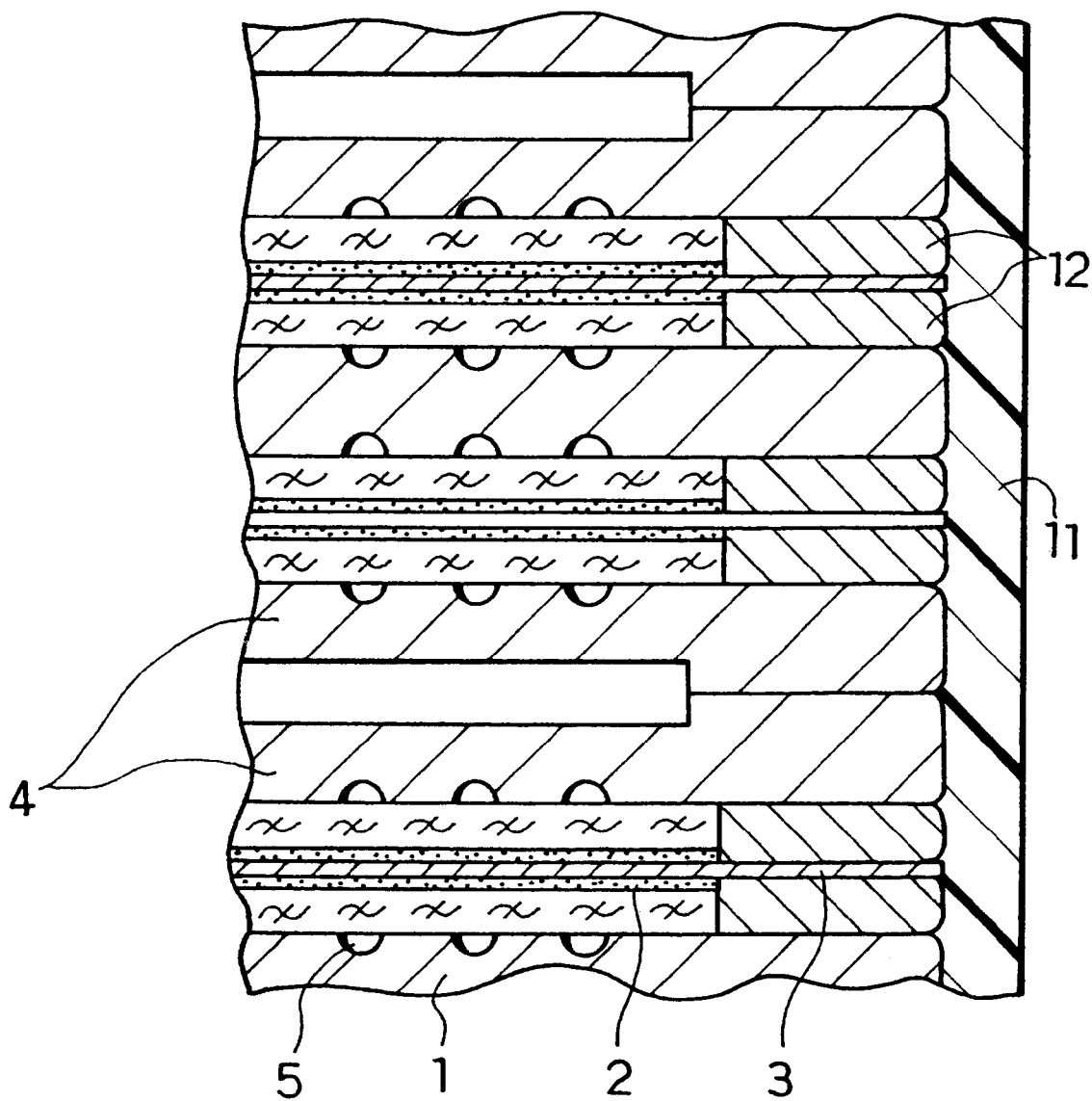
FIG. 8 is a part schematic cross-sectional view showing a structure of a polymer electrolyte fuel cell in accordance with an embodiment of the present invention.

After the above-mentioned evaluation on the cell performance, the cells were deassembled for observing the state of the interior. FIG. 8 shows the schematic cross-sectional view of the flank part of the cells. The state of the painted phenolic resin 11 covering the surface of the flanks and binding with the separators 4 made of carbon, and the PET sheets 12 is able to be satisfactorily observed. As a result of a trial use of butadiene rubber dissolved in an ester solvent in place of the phenolic resin as a resin for painting on the surfaces of the flanks, a technical advantage in the sealing substantially equivalent to that of the phenolic resin was obtained. As described previously, it is needless to say that a number of the known resins other than the phenolic resin used in this example are available for this purpose.

EXAMPLE 2

Figure 9:
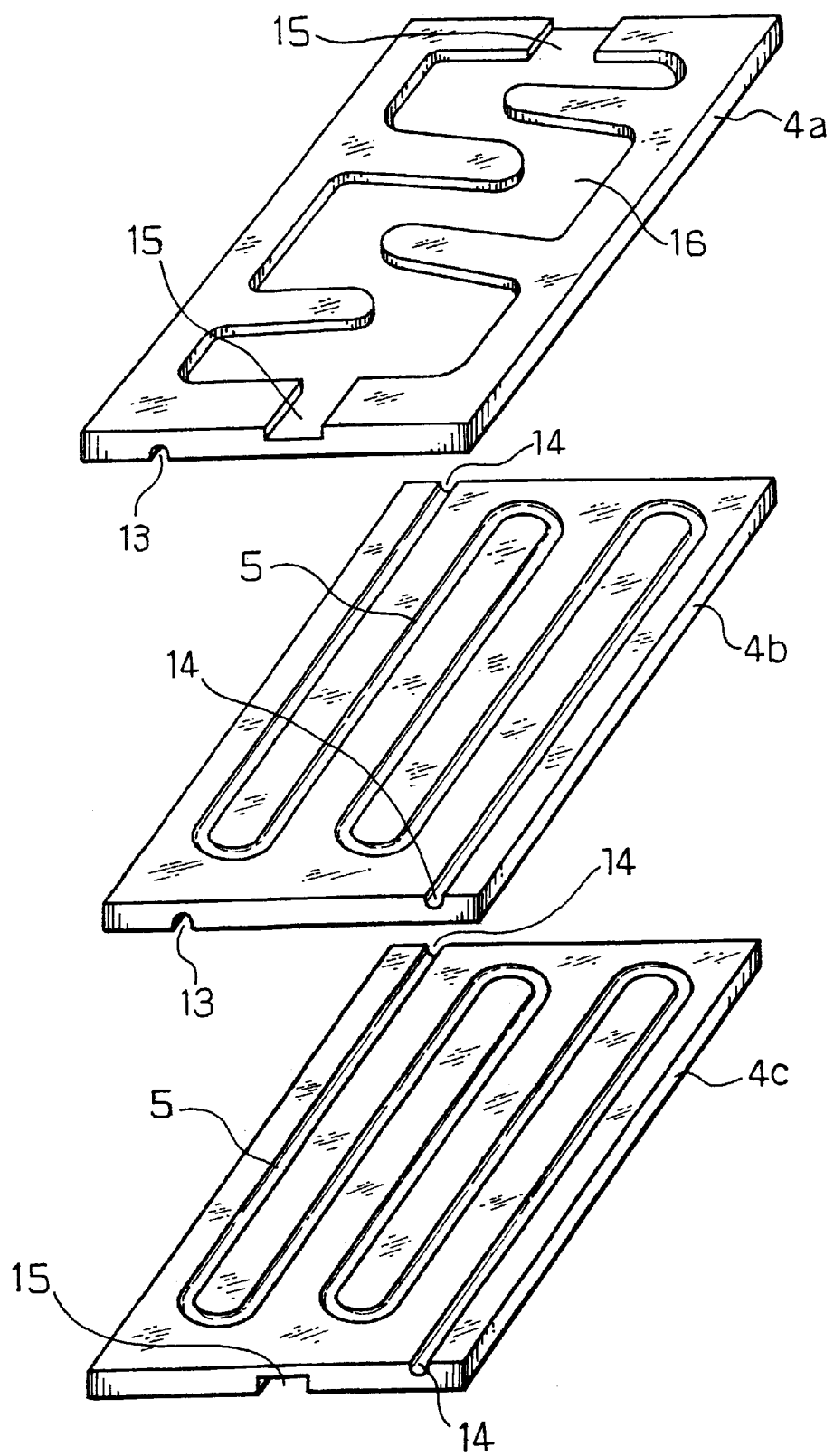
FIG. 9 is an exploded schematic perspective view showing a configuration of a separator plate used in the embodiment of the present invention.

In the cell produced in Example 1, there was a need for preventing the resin painted on the manifold from blocking the gas distributing ports. For that purpose, there had been a limitation on the concentration and the viscosity of the resin composition for the painting, and the diameter of the gas distributing ports. Therefore, in the cell in accordance with this example, the outer manifold system is employed in place of the inner manifold system. FIG. 9 shows a configuration of the separator used here.

As shown in FIG. 9, no manifold is provided on the separators, and only the flow paths were arranged over the entire surfaces thereof. And, the separator in the cell constituting unit was configured with a separator 4a having a flow path 16 for the cooling water on its one face and a gas flow path 5 on its other face, a separator 4b having a gas flow path 5 on its one face and a gas flow path 6 on its other face, and a separator 4c having a gas flow path 5 on its one face and a flow path 15 for the cooling water on its other face. Inlet and outlet ports 13 for hydrogen gas which communicated to the gas flow path 5, inlet and outlet ports 14 for air which communicated to the gas flow path 5, and an inlet and outlet ports 15 for the cooling water which communicated to the flow path for the cooling water 16 were provided on the confronting sides, respectively so that the outer manifolds can be positioned on the opposite flanks of the laminated unit cells when the unit cells are laminated. In this configuration, the flow paths 16 were formed on the surfaces of the separators by means of machine tool cutting. For instance, the gas flow paths 5 of the present example were formed by engraving grooves having a width of 2 mm and a depth of 1 mm on the surfaces of the separators.

The configuration of the electrodes is the same as that shown in FIG. 5. The PET sheets were arranged as the spacers around the circumferences of the electrodes. In compliance with a pattern of the structure wherein after stacking two unit cells with the separator 4b between them, the separators 4a and 4c serving as cooling units were stacked on and beneath the two unit cells, a cell module is assembled by laminating 50 unit cells. No O-ring was used for sealing the cooling unit. Different from the cell of Example 1, there is no need for providing the inlet and outlet ports for the fluids on the current collectors, the insulation plates and the end plates, respectively. Units for the binding rods were provided on the side of the confronting flanks other than the flanks where the gas inlet and outlet ports are opened. Next, in a manner similar to that for the cell of Example 1, the flanks were covered with the phenolic resin as the sealant. During this process, a care was so taken that the sealant would not close the inlet and outlet ports for the gases and the inlet and outlet ports for the cooling water.

Subsequently, as shown in FIG. 1, the outer manifolds 25 made of a phenolic resin having a semi-cylindrical shape were provided on the confronting flanks of the cell module so as to cover the respective rows of the inlet and outlets port for hydrogen, the inlet and outlet ports for air, and the inlet and outlet ports for the cooling water. The outer manifolds 25 were fixed at the end plates with screws 26. In this structure, the sealing between the outer manifolds and the sealants covering the flanks of the cell was performed with a silicone resin.

A cell performance test was conducted on this module of 50 cells by distributing hydrogen, air and cooling water. The obtained cell output was 1020 w (30A–35 V) under the conditions of a hydrogen utilization rate of 70%, an oxygen utilization rate of 20%, a temperature of hydrogen humidifying bubbler of 85° C., a temperature of oxygen humidifying bubbler of 75° C., and a cell temperature of 75° C.

In addition, when the number of the steps for assembling the cell module was reduced by a method of fixing the outer manifolds made of a resin before configuring the sealants on the flanks of the cell, and thereafter painting and then drying the sealant, a similar performance was obtained.

Further, although the outer manifolds made of a resin are used in this example, it is needless to say that manifold made of a metal can also be used if the sealing sections of the manifolds in contact with the cell is electrically insulated.

This example demonstrates that, by adopting a method of arranging the sealant over the entire flanks of the polymer electrolyte fuel cell, the outer manifold system which has conventionally been used in a fuel cells of the molten carbonate salt type or the like can be realized with ease.

If the structure of this example is adopted, it is possible to manufacture the manifold units and the laminated unit cells module, separately. By this process, it is demonstrated that the laminated unit cells modules comprising the separators, the electrodes, the electrolyte films and the like of the same shape which are not dependent on, for instance, the application and the output scale, can be manufactured in a large quantity, while the manifold units are manufactured in compliance with the application and the output scale. And, thus, it can contribute to the reduction in the overall manufacturing cost.

EXAMPLE 3

In the cells described in EXAMPLEs 1 and 2, the structure was illustrated for the MEAs of arranging the PET sheets around the circumference of the electrodes. In this example, a cell of such a structure wherein the PET sheet was omitted and the carbon paper electrode with the catalytic reaction layer painted thereon was made to have the same size as that of the carbon separator and to reach the flanks of the laminated unit cells.

As in the cell of Example 2, the sealants were provided on the flanks of the laminated unit cells and the outer manifolds were joined thereon. The configuration other than this was the same as that of the cell of Example 2 and the laminated unit cells module of 50 unit cells was assembled. It was however confirmed at the gas sealing test in advance to the cell performance test that if the viscosity of the phenol resin composition was too high, the sealing property was deteriorated. In this example, a care was therefore taken on the viscosity of the resin compositon.

As the result of the cell performance test of the module, an output of 1080 W (30A–36V) was obtained under the same conditions as that of Example 1. This result is rather high as compared with one that has a spacer of the PET sheets or the like. It is regarded that the reason for this is the fact that an electrode can have substantially the same area as the carbon separator, because the sealant 17 is applied at the edge of the electrode from the outside of the cell.

As illustrated by this example, it is confirmed that the sealing of the cell constituting members from their outside of the laminated body is very effective for realizing the more compactness of the cell.

In addition, the manufacturing method of the laminated unit cells illustrated by Examples 1 through 3, i.e. the method of stacking the cell constituting members in a predetermined order and fixing the laminated unit cells by the end plates or the like and, thereafter, arranging the sealants on the flanks thereof, can greatly reduce the manufacturing steps as compared with a method of successively arranging the sealants on the flanks, while stacking the cell constituting members.

Further, although the carbon separator used in this example is for the outer manifold type used in Example 2, it may also be configured for the inner manifold type.

EXAMPLE 4

For actually putting the solid electrolyte fuel cells to practice, it is required to have a reliability for various impact forces and thermal strains induced by heat cycles. In this example, the following evaluation was therefore conducted on this points.

The production of the cell of this example was performed in a manner similar to that in Example 3. After sealing the flanks of the laminated unit cells with the phenolic resin, it was however covered with a cloth made from glass fiber having a thickness of about 1 mm. And, then, the cloth was impregnated and painted with the phenolic resin and finally solidified into a composite material.

When the laminated unit cells of Example 3 was dropped from the height of 1 m, the laminated structure was broken and the gas was leaked though. But, no gas leakage was observed with the cell of this example even at a dropping test from the height of 3 m because the sealing portions of the cell were reinforced with the cloth of glass fiber.

In addition to this, if a cloth of carbon fiber having a larger tensile strength was employed in place of the cloth of glass fiber, no gas leakage was observed with the cell even at a dropping test from the height of 7 m.

As a result of the cell performance test conducted under the same conditions as Example 1, 1080 W (30A–36V) was obtained.

Although the woven cloth is used in the cell of this example, a similar technical advantage is obtained by the use of a non-woven fabric, a mesh or the like.

The reason for this is believed to be due to the fact that, as compared with the conventional cell wherein the binding force is exerted from the remote two end plates, the respective adjacent cell constituting members can be more directly fixed by the method of this example in addition to the binding pressure (5 kgf/cm$^2$) from the end plates.

Also, the resins of phenolic type which have been employed as the sealants of the foregoing examples have certain heat-resistance and become very rigid and brittle after being cured. When the cell produced in this example was subjected to a repetition of a heat cycles between 5 and 100° C. for five times, cracks presumably due to the thermal strain developed on the sealing surfaces of the flanks and the gas and the cooling water were leaked. In order to obviate this drawback, when a silicone resin having a larger extensibility than the phenolic resin was applied on the sealing surface and, further, the phenolic resin was applied on the silicone resin and molded, the obtained cell could withstand the above-mentioned heat cycle for not less than 20 times. In addition, by a concurrent use of the cloth of a fiber, a production of a cell having both of the durability to the heat cycle and the mechanical strength was possible.

As described previously, by the combined use of not less than two kinds of the material having the different mechanical properties such as Young's modulus and tensile strength, the laminated unit cells module having a high durability to the heat cycle and a high mechanical strength can be made.

EXAMPLE 5

During a continuous operation of the polymer electrolyte fuel cell, a remarkably high binding pressure should be constantly applied on from the both ends of the electrodes. At that time, it is problematic that the end plates and the biding rods have to be large and long to be an obstacle. In this example, the following evaluation was therefore conducted by the use of a carbon fiber cloth.

By setting the binding pressure applied between the both end plates at the time of assembling the laminated unit cells to a rather high 10 kgf/cm$^2$, the sealants were provided on the flanks of the cell by the use of the same phenolic resin and the carbon fiber cloth as those of the cell of Example 4. After solidifying the phenolic resin sufficiently, the binding pressure applied onto the end plate was gradually reduced by loosing the binding rods. By making the configurations other than this the same as that of the cell of Example 4, the cell of this example was produced.

When the thus obtained cell was subjected to the same dropping test as that of the above-mentioned example, the cell could withstand the dropping test of 5 m. In addition, it was found that the cell could withstand the dropping test of 5 m even in a case of reducing the binding pressure applied between the end plates down to 0.5 kgf/cm$^2$.

Although the end plates made of stainless steel having a thickness of 20 mm were used in this example, a similar mechanical strength was obtained by using the end plates made of stainless steel having a thickness of 5 mm at the binding pressure applied between the end plates of 0.5 kgf/cm$^2$. In addition to this, a similar technical advantage was obtained by the use of a lightweight material such as reinforced plastics or the like in place of the metal such as stainless steel.

Further, by setting the binding pressure to 20 kgf/cm$^2$ and, then, solidifying the phenolic resin sufficiently, the end plates were removed by loosening the binding rods. Even in this state, the laminated unit cells module was maintained in the combined and laminated state and had a satisfactory mechanical strength. Further, it was confirmed that no gas leakage was observed after a dropping test from the height of 3 m.

The structure illustrated in this example can omitt the end plates and can realize a further compactness and a lightweight cell.

EXAMPLE 6

By immersing a carbon powder having a particle size of not larger than several microns in an aqueous solution of chloroplatinic acid and, the carbon powder was caused to carry a platinum catalyst on the surfaces of the respective particles by a reduction process. In this process, the ratio by weight of the carbon to the carried platinum was set to 1:1. Next, this platinum-carrying carbon powder was dispersed in an alcoholic solution of a polymer electrolyte, thereby to obtain a slurry.

Separate from this, a carbon paper with a thickness of 400 $\mu$m which finally served as an electrode was given a water repelling property, by being impregnated with an aqueous dispersion of a fluorocarbon resin (Neoflon ND 1 available from DAIKIN INDUSTRIES, LTD.) and thereafter dried, and thermally treated at 400° C. for 30 minutes.

Figure 10:
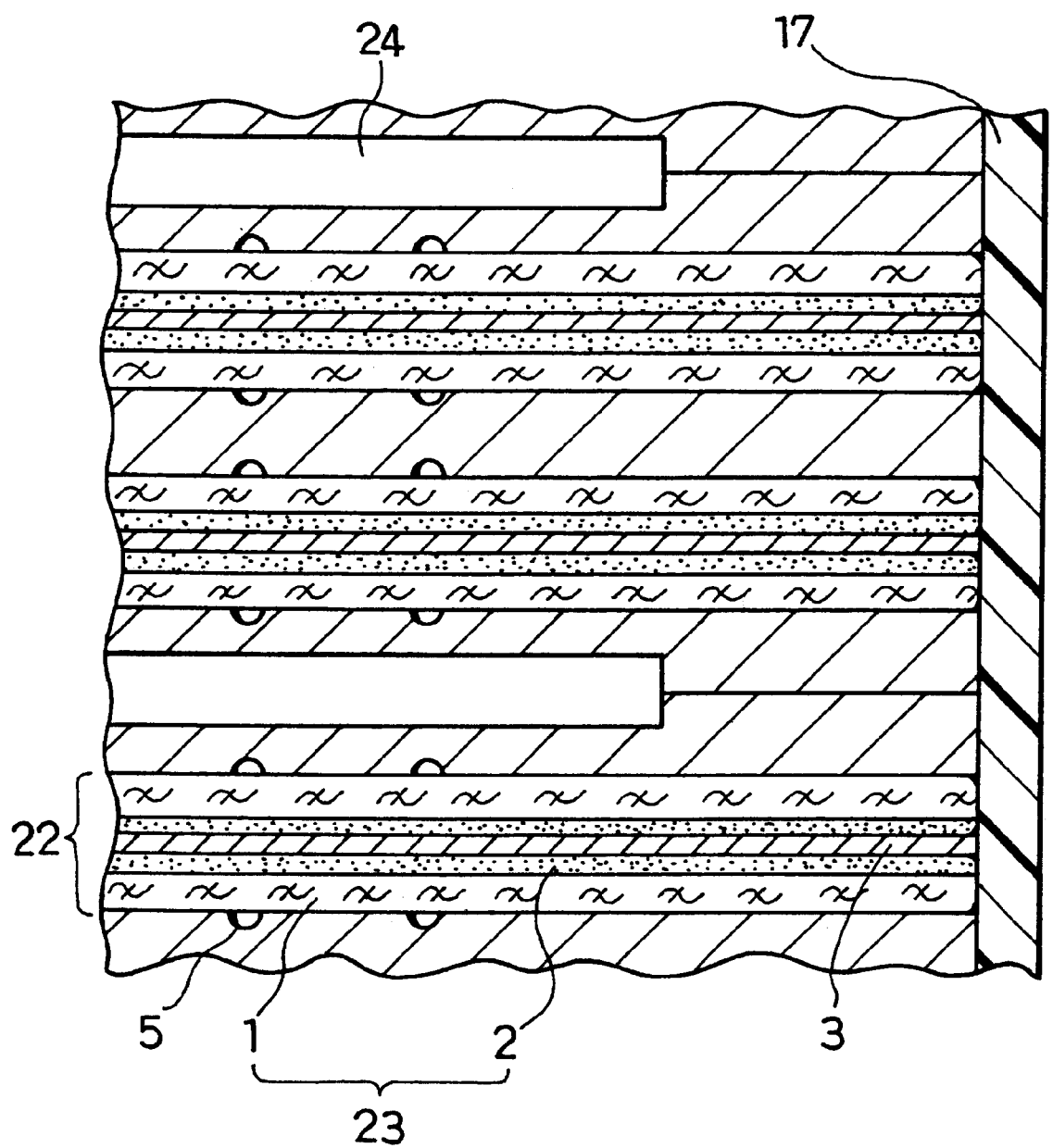
FIG. 10 is a part schematic cross-sectional view showing a structure of a polymer electrolyte fuel cell in accordance with an embodiment of the present invention.

As shown in FIG. 10, by uniformly painting the above-mentioned slurry containing the carbon powder on one surface of the carbon paper electrode which had been subjected to the water-repelling treatment, a catalytic reaction layer 2 was formed.

The carbon paper electrode 1 and an electrolyte film 3 were cut to have a size of 12×12 cm. And, after sandwiching the electrolyte film 3 with a pair of the carbon paper electrodes while directing their faces on which the catalytic reaction layers 2 were formed inwards, the stacked body was dried, thereby to produce an MEA 22.

Next, a unit cell was configured by sandwiching this MEA 22 with a pair of separators 4 made of carbon having a gas-tightness. The separator 4 had a thickness of 4 mm.

By stacking two of the above-mentioned unit cells, a cell constituting unit was obtained. No O-ring was used in the cooling unit.

The separator for the cell constituting unit was configured, as shown in FIG. 9, with a separator 4a having a flow path 16 for the cooling water on its one face and a gas flow path 5 on its other face, a separator 4b having a gas flow path 5 on its one face and a gas flow path 6 on its other face, and a separator 4c having a gas flow path 5 on its one face and a flow path 15 for the cooling water on its other face. Inlet and outlet ports 13 for hydrogen gas which communicated to the gas flow path 5, inlet and outlet ports 14 for air which communicated to the gas flow path 5, and an inlet and outlet ports 15 for the cooling water which communicated to the flow path for the cooling water 16 were provided on the opposite sides, respectively.

The gas flow paths 5 and 6 and the flow paths 16 for the cooling water were formed on the surfaces of the separators by means of machine tool cutting. For instance, the gas flow paths 5 of the present example were formed by engraving grooves having a width of 2 mm and a depth of 1 mm on the surfaces of the separator plates.

By laminating 50 unit cells, stacking each one pair of metallic current collectors in the form of plate, electrical insulation plate and ends plates in that order. And, the stacked body was binded with bolts which penetrated the stacked body and nuts from the surfaces of both end plates to produce the laminated unit cells. The binding pressure applied at that time was 10 kgf/cm$^2$ for the unit area of the separator. The binding rod portions for binding the cell module were provided on the flanks other than the flanks on which the gas input and output ports were open.

Next, sealing portions 20 were formed by using a phenolic resin as the sealant and covering the flanks of the laminated unit cells by painting the flanks with a phenolic resin composition and then drying. At that time, a care was taken for not closing the gas inlet and output ports and the inlet and outlet ports for the cooling water with the sealant. In addition, the phenolic resin was painyed on the portions in contact with the sealing surfaces of the outer manifolds while paying attention for maiking the surfaces as even as possible.

Next, the semi-cylindrical outer manifolds 25 made of stainless steel as shown by FIG. 1 were joined on the laminated unit cells so as to cover the rows of the hydrogen gas inlet and output ports 13, the air inlet and outlet ports 14, and the inlet and outlet ports 15 for the cooling water which were exposed to the flanks of the laminated unit cells. These manifolds 25 were fixed at the end plates with screws 27.

In addition, the sealing between the outer manifolds and the sealant covering the flanks of the cell was performed by the use of gasket 16.

The gascket 16 was prepared by cutting a sheet of ethylene-propylene-butadiene ternary copolymer composition (EPDM) having closed cells into a predetermined form which corresponded to the sealing part of the outer manifold.

A cell performance test was conducted on this laminated unit cells by distributing hydrogen, air and cooling water. The obtained cell output was 1020 w (30A–35 V) under the conditions of a hydrogen utilization rate of 70%, an oxygen utilization rate of 20%, a temperature of hydrogen humidifying bubbler of 85° C., a temperature of oxygen humidifying bubbler of 75° C., and a cell temperature of 75° C.

Although gas leakage was measured during the test, the leakage was not detected and it was found that a preferable sealing property was obtained.

This example demonstrates that, by adopting a method of arranging the sealing material over the entire flanks of the polymer electrolyte fuel cell, the outer manifold system which has conventionally been used in a fuel cells of the molten carbonate salt type or the like can be realized with ease.

Further, if the structure shown by this example is adopted, it is possible to manufacture the manifold units and the laminated unit cells module, separately. By this process, it is demonstrated that the laminated unit cells modules comprising the separators, the electrodes, the electrolyte films, and the like of the same shape which are not dependent on the application and the output scale can be manufactured in a large quantity. Of cource, the manifold units are manufactured in compliance with the application and the output scale. Thus, the present invention can contribute to the reduction in the overall manufacturing cost.

EXAMPLE 7

In this example, outer manifold type fuel cells were produced by generally following the procedure of Example 6, except for varying the viscosity of the phenolic resin composition. And, in advance to the cell performance test, a gas sealing test was conducted. As the result thereof, it was found that if the concentration of the phenolic resin composition was too high and the viscosity thereof was too high, the sealing property was deteriorated. As the result of a cell performance test of the module conducted under the same conditions as that of Example 6, an output of 1080 (30A–36V) was obtained. This value was rather high as compared with the fuel cells using the conventional spacer of PET sheet or the like. It is regarded that the reason for this is that the electrode structure having substantially the same area as the carbon separator because the sealing at the edges of the electrode were performed from the outside.

A test including the start-up and the stop simultaneously with the heat cycles from room temperature to 80° C. was conducted on the laminated unit cells continuously for ten times. As the result thereof, it was found that no gas leakage from the outer manifold was detected and that the sealing property of the outer manifold was maintained even if a creep developed in the thickness direction of the laminated unit cells.

As illustrated in this example, it is very effective for realizing the compactness of the cell to seal the laminated unit cells from the outside.

In addition, the manufacturing method of the laminated unit cells illustrated by Examples 6 and 7, i.e. the method of stacking the cell constituting members in a predetermined order and fixing the laminated unit cells by the end plates or the like and, thereafter, arranging the sealants on the flanks thereof, can greatly reduce the manufacturing steps as compared with a method of successively arranging the sealants on the flanks, while stacking the cell constituting members.

EXAMPLE 8

In order to put the solid polymer electrolyte fuel cells to practice, it is required to have a reliability for withstanding various impact forces and thermal strains induced by heat cycles. In this example, the following cell was therefore produced.

The procedure of Example 6 was generally followed for producing another laminated unit cells. And in place of sealing the flanks thereof with the phenolic resin, the flanks were sealed with a polyisobutylene rubber. Thereafter, the sealed flanks were covered with a liquid crystal polymer which was an engineering plastic to a thickness of 1 mm and then solidified.

When the laminated unit cells produced in Example 7 was dropped from the height of 1 mm, its laminated structure was warped, thereby to occur a gas leakage. No gas leakage was observed with the cell of this example even at a dropping test from the height of 5 m because the sealing portion was reinforced with the engineering plastic.

A cell performance test conducted under the same conditions as Example 6 resulted in 1080 W (30A–36V).

In addition, although the phenolic resin used in Examples 6 and 7 as the sealing material has a heat-resistance of a certain degree, it becomes very rigid and relatively brittle after being cured.

When the heat cycle from room temperature to 80° C. was repeated for 10 times on the cells produced in this example and Example 7, although no gas leakage from the sealing surfaces of the outer manifolds was detected, cracks presumably due to the thermal strain developed on the sealing surfaces of the flanks of the laminated unit cells of Example 7, thereby to occur the gas leakage as well as the cooling water leakage.

In contrast, the cell produced by this example was made to withstand the previously-mentioned heat cycles of not less than 100 times, because the isobutylene rubber having a higher extensibility as compared with the phenolic resin was applied to the sealing surface and, further, the applied phenolic resin was covered with the engineering plastic to mold.

As described previously, by the combined use of not less than two kinds of the material having the different mechanical property such as tensile strength, Young's modulus and the like, a production of the laminated unit cells module having a high durability for the heat cycle and a high mechanical strength is made possible.

EXAMPLE 9

During a continuous operation of the polymer electrolyte fuel cell, a remarkably high binding pressure should be constantly applied between the both ends of the electrodes. At that time, the fact that the end plates and the biding rods are excessively large and long becomes an obstacle to the requirement. In this example, gas sealing portions on its flanks were joined on the outer manifold with an adhesive to obtain a fuel cell, the evaluation thereof was therefore conducted.

By setting the binding pressure between the end plates to be fixed at the time of assembling the laminated unit cells to a rather high 10 kgf/cm$^2$, the sealants on the flanks of the cell and the outer manifolds were configured by the use of the polyisobutylene rubber and the engineering plastic. And, the gas sealing surfaces were joined with a silicone rubber adhesive in a manner similar to those of the cell of Example 8.

And, after causing the adhesive to solidify sufficiently, the binding pressure between the end plates was gradually reduced by loosing the binding rods. As in the same configurations other than this as the cell of Example 8, the cell of this example was produced.

When the obtained cell was subjected to the dropping test, it was found that it could withstand the dropping test of 5 m. In addition, it was found that the cell could withstand the dropping test of 5 m even in the case of reducing the binding pressure applied at the previous step between the end plates down to 0.5 kgf/cm$^2$.

Although the end plates made of stainless steel having a thickness of 20 mm were used in this example, a similar mechanical strength was obtained by using the end plates made of stainless steel having a thickness of 5 mm at the binding pressure applied between the end plates of 0.5 kgf/cm$^2$. In addition to this, a similar technical advantage was obtained by the use of a lighter material such as reinforced plastics or the like in place of the metal such as stainless steel.

Further, by setting the binding pressure to 20 kgf/cm$^2$, the end plates were removed by loosening the binding rods. Even in this state, the laminated unit cells module was maintained in the combined and laminated state and had a satisfactory mechanical strength, and it was confirmed that no gas leakage was ovserved after a dropping test from the height of 3 m.

The structure illustrated in this example can omitt the end plates and can realize a further compactness and a lighter-weight cell.

EXAMPLE 10

Another cell was produced by generally following the procedure of Example 9 except that the ultrasonic welding was employed for joining of the sealant of the flanks of the cell on the gas sealing surfaces of the outer manifolds.

When the thus obtained cell was subjected to the dropping test similar to that of Example 9, it was found that it could withstand the dropping test of 5 m. In addition, it was found that the cell could withstand the dropping test of 5 m even in a case of reducing the binding pressure exerted at the previous step between the end plates down to 0.5 kgf/cm$^2$.

EXAMPLE 11

In this example, a polyisobutylene rubber and the engineering plastic were applied to the flanks of the fuel cell produced in Example 4 integrally by means of injection molding.

When the cell comprising the above-mentioned flanks was subjected to the same dropping test as that of Example 9, it was found that it could withstand the dropping test of 5 m. In addition, it was found that the cell could withstand the dropping test of 5 m even in a case of reducing the binding pressure applied at the previous step between the end plates down to 0.5 kgf/cm$^2$.

EXAMPLE 12

By immersing a carbon powder having a particle size of not larger than several microns in an aqueous solution of chloroplatinic acid, the carbon powder was caused to carry a platinum catalyst on the surfaces of the respective particles by a reduction process. In this process, the ratio by weight of the carbon to the carried platinum was 1:1. Next, this carbon powder carrying the platinum was dispersed in an alcoholic solution of a polymer electrolyte, thereby to obtain a slurry.

Separate from this, a carbon paper with a thickness of 400 $\mu$m for the electrode was impregnated with an aqueous dispersion of a fluorocarbon resin (Neoflon ND 1 available from DAIKIN INDUSTRIES, LTD.) and thereafter dried and thermally treated at 400° C. for 30 minutes, thereby to give it a water-repelling property. Next, by painting the above-mentioned slurry containing the carbon powder uniformly on one surface of the above-mentioned carbon paper which had been subjected to the water-repelling treatment to form a catalytic reaction layer 2, an electrode was obtained.

After sandwiching an electrolyte film 3 with a pair of the carbon paper electrodes prepared in the above-mentioned manner while directing their faces on which the catalytic reaction layers had been formed inwards, the obtained stacked body was dried. The carbon paper electrode had a length and a width of 10 cm and was arranged on the center of the electrolyte film having a length and a width of 12 cm. By arranging a pair of silicone rubber sheets having a thickness of about 350 μm between the electrodes and the polymer electrolyte film 3 in order to prevent the supplied fuel gas from leaking or mixing with the oxidant gas and by subjecting the stacked body to a hot pressing process at 100° C. for 5 minutes, an MEA (electrode-electrolyte assembly) was obtained.

As the metallic plate for the separator, SUS 316 (stainless steel) plate having a thickness of 0.3 mm was used, and as shown in FIG. 11. And, on the central region (10 cm×9 cm) of the metallic plate, a corrugated section 1 at a pitch of 5.6 mm (width of groove: 2.8 mm) was formed by means of pressing. At that time the depth of the groove 2 (the height of the ridge 2) was set to about 1 mm.

Figure 11A:
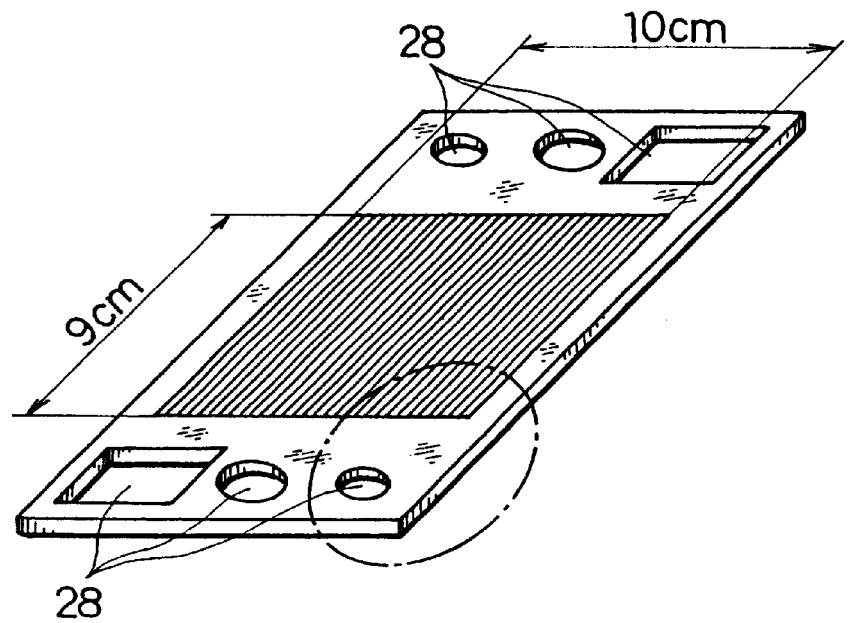
FIG. 11 is a schematic perspective view showing a separator plate used in the embodiment of the present invention.
Figure 11B:
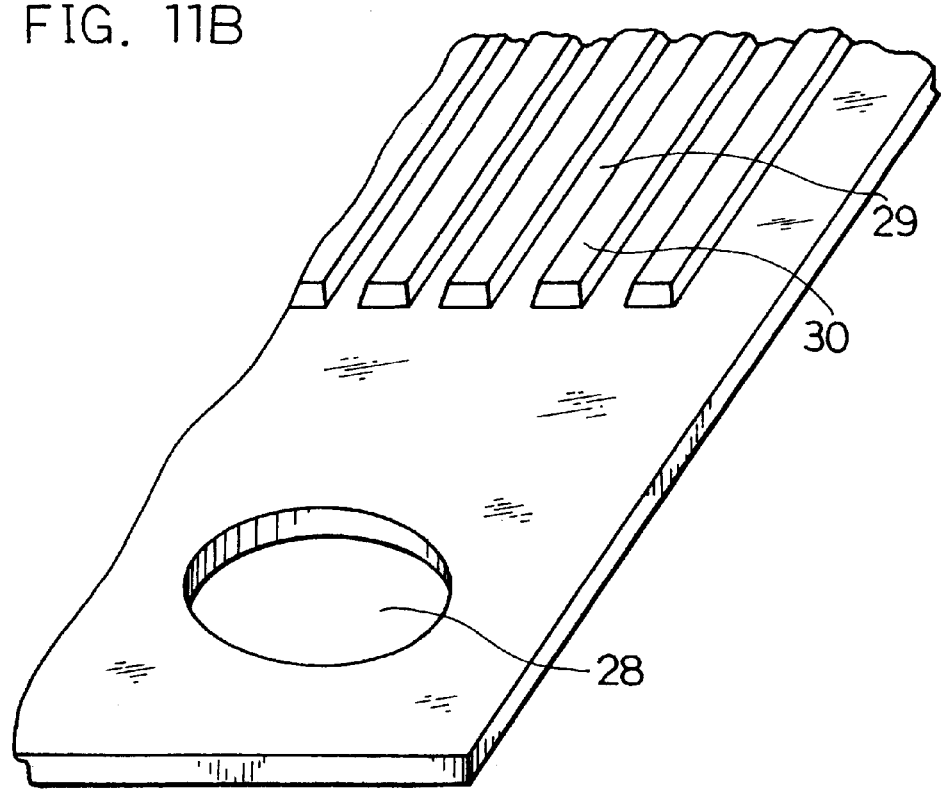

As shown in FIG. 11(a), manifold ports 28 for supplying and exhausting hydrogen gas, oxygen gas and cooling water were provided on the confronting side sections of the plate. FIG. 11(b) is a schematic enlarged view of a part of FIG. 11(a) encircled by the one dot chain line. On the surface of the separator which serves to flow hydrogen, grooves 29 for guiding the gas from the manifold ports to the gas-distributing grooves formed by the pressing of the metallic plate were provided by piling up phenolic resin to form ribs 31. Additional ribs 31 were also formed for connecting the two adjacent grooves with each other at bent sectors.

The thickness of the convex parts made from the phenolic resin was selected to about 1 mm which was equal to the height of the ridge (or the deoth of the linear groove) in the corrugated metallic plate. The convex portions were also formed around the circumference of the metallic plate made of SUS 316 and the circumferences of the manifold ports, which constituted gaskets 7 corresponding to the pattern of the metallic plate. On the surface of the separator which serves to flow air, there were formed ribs as shown in FIG. 11(b) for connecting the six adjacent grooves with each other at bent continuous sectors of the gas-distributing grooves. The reason for adopting different structures at the hydrogen side and the air side was due to the fact that the gas flow rate at the air side differed from that at the hydrogen gas side at about 25 times. Conversely speaking, according to such a structure, it is possible to realize the optimum gas flow rate and gas pressure loss by changing the pattern of the resin gas-distributing grooves in compliance with the gas flow rate.

Figure 13:
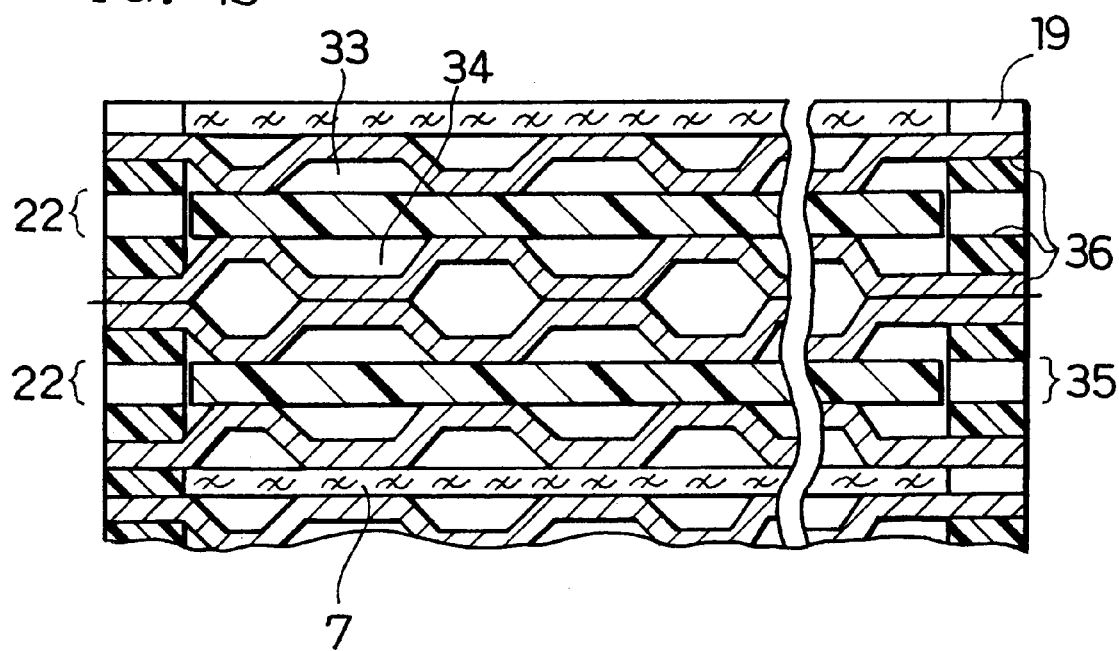
FIG. 13 is a part schematic cross-sectional view showing a structure of a polymer electrolyte fuel cell in accordance with an embodiment of the present invention.

As shown in FIG. 13, a unit cell was configured by sandwiching the MEA 22 with a pair of these two kind of separators and gasket. As shown in FIG. 13, by configuring the cell in a structure where the position of the hydrogen-distributing grooves 33 corresponds to the position of the air-distributing grooves 34, a care was taken for applying no excessive shearing force on the electrode. In every two stacked unit cells, a cooling unit 35 was provided for distributing the cooling water. By using a metallic mesh 7 made from SUS 316 for configuring the cooling unit, the electrical conductivity of the cooling unit and the distributing property of the cooling water are ensured. And, the gasket 19 made from the phenolic resin was provided at the circumference of the stacked body to form the sealing portion. On such portions where the gas-sealing property was required, for example, portions between the gasket and the MEA, between one metallic plate and the other metallic plate and between the gasket and the metallic plate, the sealing property was secured by painting grease 36 at a thin thickness without excessively reducing the electrical conductivity.

After laminating 50 unit cells, it was fixed with the end plates made of a stainless steel and binding rods, while placing current collectors, and insulator plates on top and bottom of the laminated unit cells, at a binding pressure of 20 kgf/cm$^2$. If the pressure was too small, a gas leakage might occured and contact resistance might became high, thereby to deteriorate the cell performance. Whereas, if the pressure was too large, the electrodes might be broken and the stainless steel plates might be deformed. It was therefore important to adjust the binding pressure in compliance with the design of the gas-distributing grooves.

A cell performance test was conducted on the polymer electrolyte fuel cell of this example produced in accordance with the above-mentioned process, by distributing hydrogen as the fuel gas, and air under a hydrogen utilization rate of 70%, and an oxygen utilization rate of 20%. At the test, the cell temperature is 75° C., the humidifying temperature at the hydrogen side is 80° C., a humidifying temperature at the oxygen side is 75° C. The electrical output of 1050 w (35V–30A) was obtained.

Figure 14A:
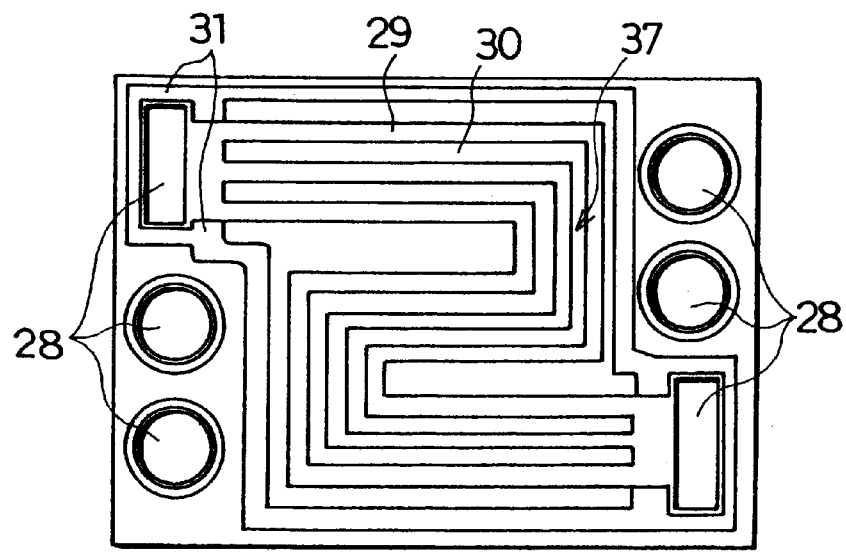
FIG. 14 is a schematic perspective view showing a separator plate used in the embodiment of the present invention.
Figure 14B:
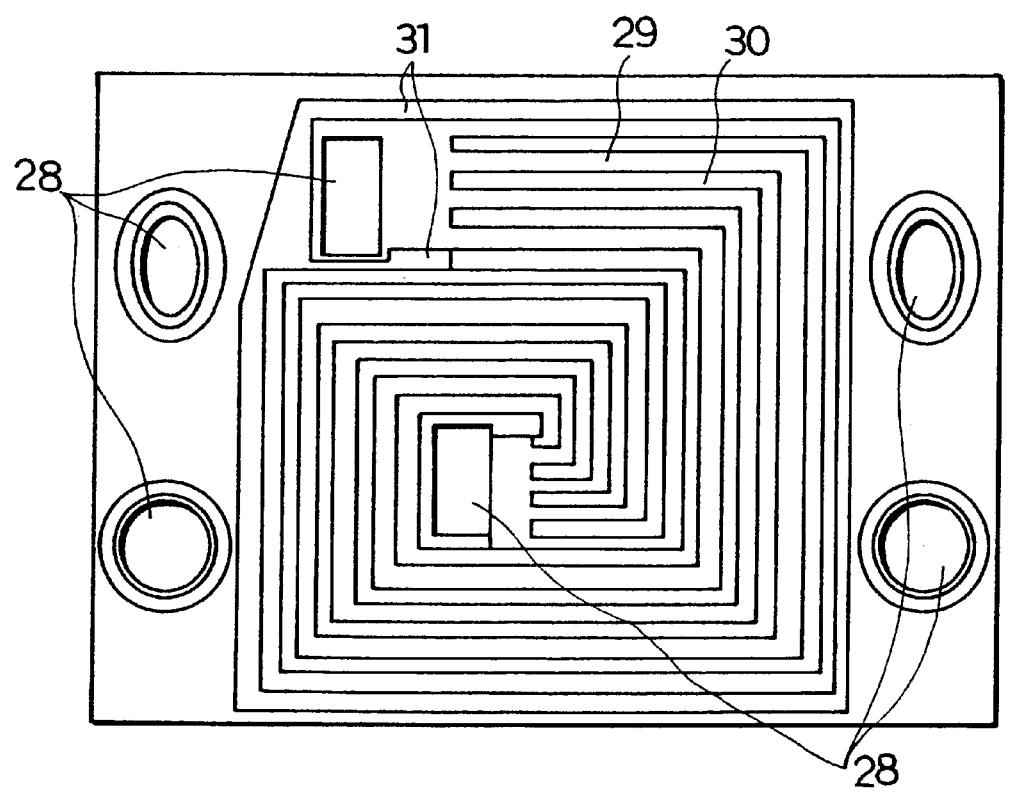

Although the gas-distributing grooves were configured with a plurality of parallel straight lines in this example, various other structures may also be possible; for instance, a structure of connecting the manifold port for the gas supply to the manifold port for the gas exhaust through gas-distributing grooves having two bent sections as shown in FIG. 14(a), another structure of connecting the central manifold port to the outside manifold port through gas-distributing grooves having a pattern of roll shell as shown in FIG. 14(b), and the like.

EXAMPLE 13

Although the gas-distributing grooves were formed by using the phenolic resin in Example 12 as a material having no permeability for the fuel gas, a carbon material or a rubber material may also be used as a material having a easy moldability. In this example, a rubber-like material was therefore used for a trial production.

Figure 12A:
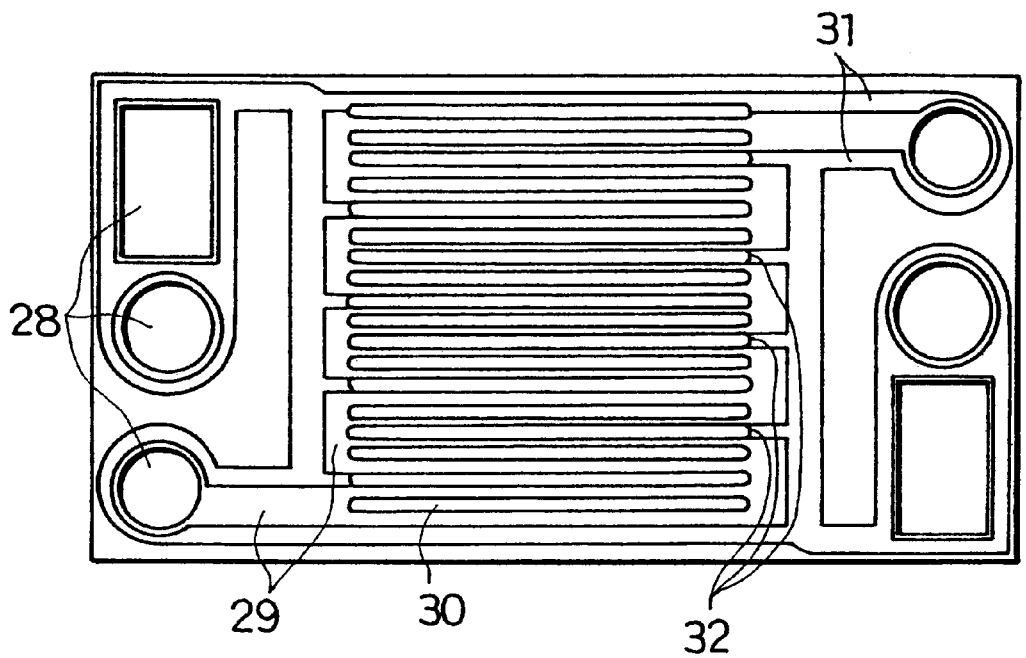
FIG. 12 is a schematic plan view showing a separator plate used in the embodiment of the present invention.
Figure 12B:
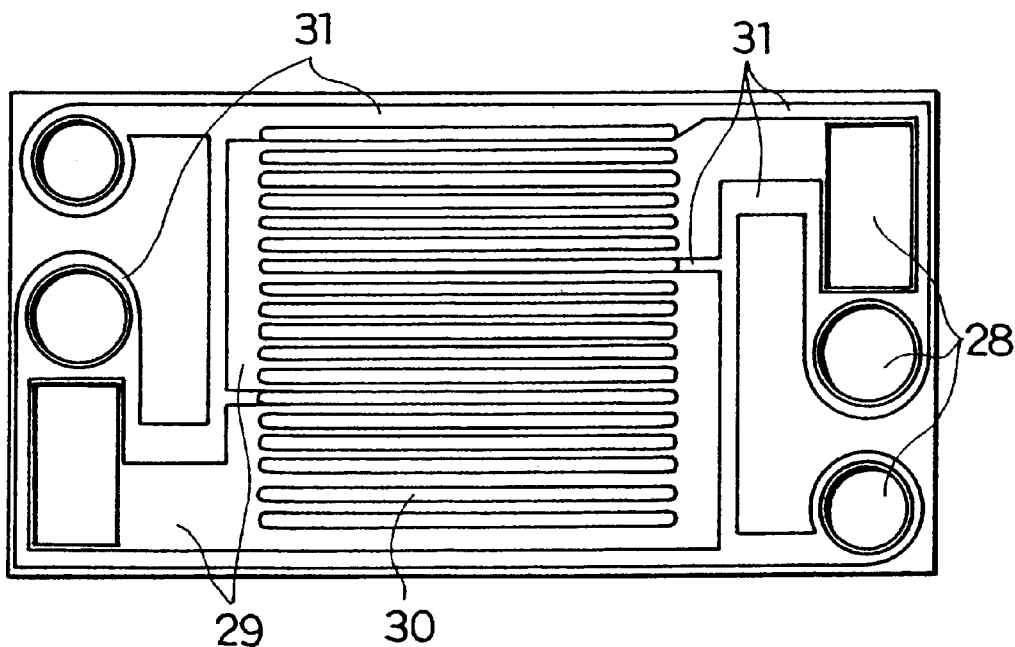

A sheet of isobutylene rubber having a thickness of about 1 mm was cut to have the same form as the phenolic resin gasket used in Example 12, and was used with the stainless steel plate for configuring the separator. Although there was a need for using the grease in number of spots of the phenolic resin gasket in Example 12, there was no need for using the grease in this example except the portions between the two metallic plates. Further, in the case of the phenolic resin gasket, a care had to be taken about a tendency of leaking gas through the connecting points (32 in FIG. 12) between the gas-distributing grooves configured with the metallic plate and the gas-distributing grooves configured with the phenolic resin. However, substantially no gas leaking occurred through these portions in this case of using the isobutylene rubber sheet.

As the result of the trial production using the resin sheet such as silicone rubber sheet, a Teflon (polyfluoroethylene fiber) sheet, or the like, it was found that substantially no gas leaking occurred from the members which had been maintained their gas-sealing property by being pressed against the surface of the metal at a pressure of 30 kgf/cm$^2$. In addition, when the gasket made from the isobutylene rubber sheet had previously been fixed integrally with the metallic plate of SUS with an adhesive, the assembling of the laminated unit cells was performed simply and conveniently.

A cell performance test was conducted on the polymer electrolyte fuel cell of this example produced in accordance with the above-mentioned process, by distributing hydrogen as the fuel gas, and air at a hydrogen utilization rate of 70%, and an oxygen utilization rate of 20%. At the test, the cell temperature is 75° C., the humidifying temperature at the hydrogen side is 80° C., a humidifying temperature at the oxygen side is 75° C. As a result, the electrical output of 1050 w (35V–30A) is obtained.

EXAMPLE 14

In Examples 12 and 13, although the gas-distributing grooves were formed on the central part of a metallic plate by means of pressing, the yield of this process was about 50% at most because a strain or a warp might develop in the metallic plate even with a slight change in the pressing conditions. A trial production was therefore conducted, whereby a metallic plate requiring the pressing was separated from an even metallic plate for the gas sealing.

Figure 15:
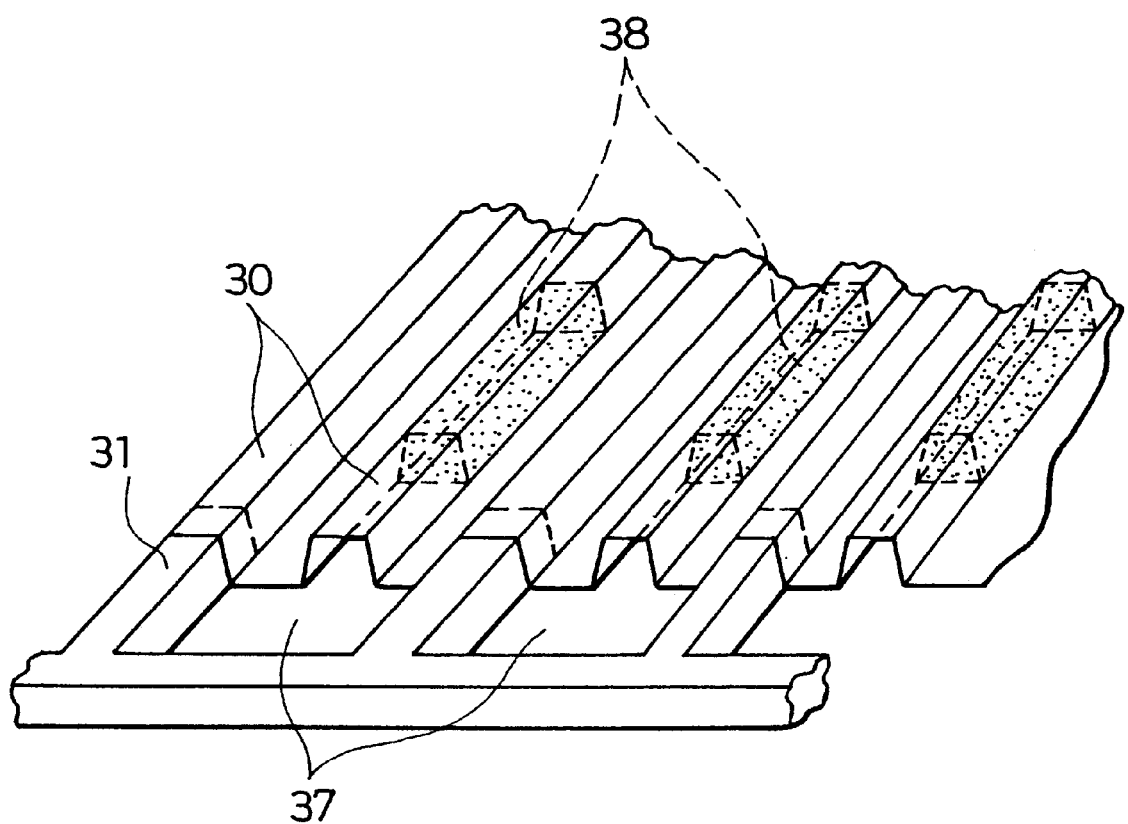
FIG. 15 is a schematic perspective view showing a configuration of a separator plate used in the embodiment of the present invention.

In accordance with this example, a SUS plate having a thickness of 0.3 mm and a width of 9 cm was subjected to a bending process in one direction to have a fin structure having trapezoids. The period in the bending was set to 5.6 mm (width of the groove: 2.8 mm) which was the same as Example 1. As shown in FIG. 15, a structure was taken, whereby the tips of the ribs 31 of the rubber material which constituted the gas-distributing grooves 37 at bent sections were partly inserted into rear faces of the convex section 30 of the SUS 316 plate for maintaining the sealing property.

In addition, rubber sheets 38 were inserted into the rear portions of the convex section 30 of the SUS 316 plate wherein no fuel gas should be distributed, thereby to close the gaps. In this manner, the same configuration of the separator of Example 1, was realized. As the result of the cell performance test conducted on the laminated 50 cells configured with this separator, an output of 1010 W (34V–30A) was obtained.

EXAMPLE 15

The processing yield of the separator, wherein the gas-distributing grooves were formed on the central part of the metallic plate by pressing, was poor because a warp or a strain might develop in the metallic plate even with a slight change in the pressing conditions. An investigation was therefore conducted on the process of the pressing of a metallic plate as in Example 12.

First, a fin structure having the same trapezoid as that in Example 14 was obtained by means of bending or pressing. Next, a part except for the central region of 10 cm×9 cm was flattened by pressing (up to a pressure of 500 kgf/cm$^2$). The flattening was made easy by raising the temperature. Finally, the manifold ports were provided on the both sides of the separator. Although the process on the metallic plate was very effective in the case of using a material which was easy to cause a plastic deformation such as aluminum and the like, there was a need for providing a countermeasure against a possible corrosion or the like.

As the result of the cell performance test, an output of 1020 W (34V–30A) was obtained.

EXAMPLE 16

The foregoing examples disclose the formation of the gas-distributing grooves on either one of the air flowing side or the hydrogen flowing side of the separator by means of other than the machine tool cutting. In this example, one groove-forming step was employed to form the grooves on both the front and rear faces of the metallic plate for the gas-distributing grooves.

Figure 16:
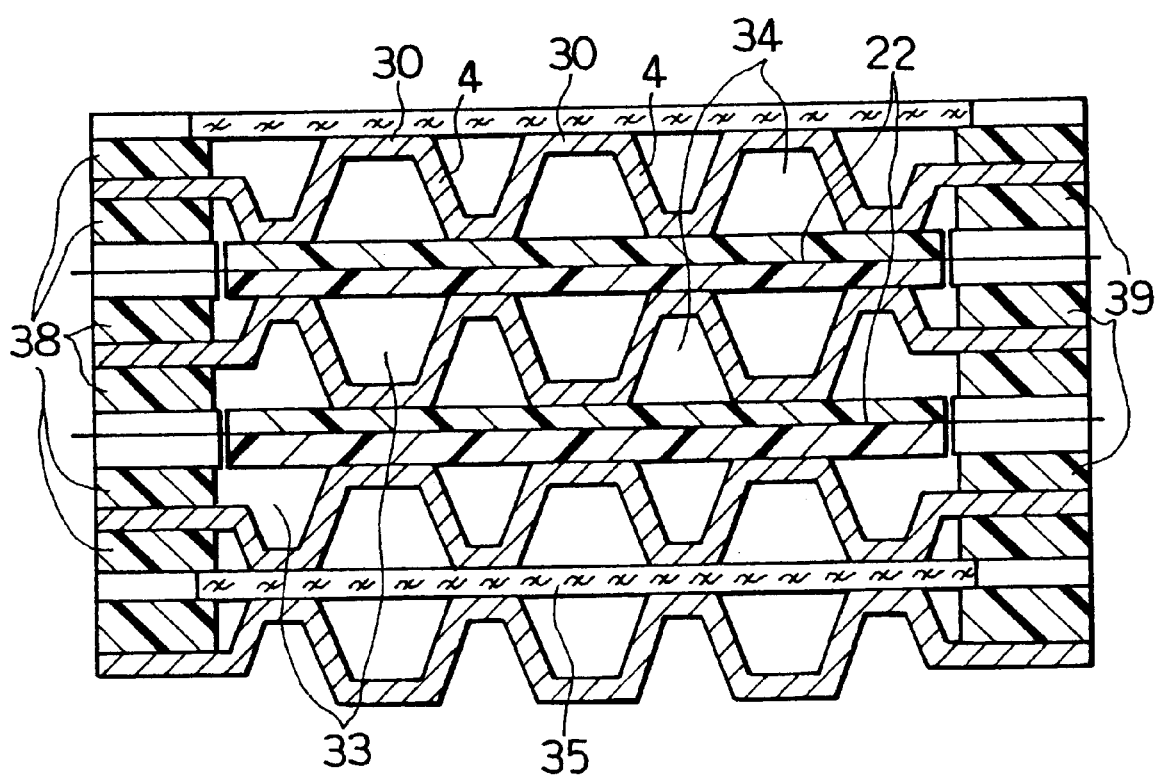
FIG. 16 is a part schematic cross-sectional view showing a structure of a polymer electrolyte fuel cell in accordance with an embodiment of the present invention.

That is, as shown in FIG. 16, grooves were formed on a separator 4 made of SUS 316 so that the height of the circumferential section 39 of the separator 4 was to have a half height of the height of the concave portion and the convex portion, and the manifold ports were provided on the separator. Further, by arranging the rubber sheets 38 made of isobutylene rubber on both the front and rear faces of the separator by setting the height of the rubber sheet to the height of the convex part 30 of the separator 4, the gas-distributing grooves similar to those of Example 1, and 2 were formed. When the laminated unit cells was configured by using the separator, a care was taken for making the positions of the grooves to coincide with each other at both the air flowing side and the hydrogen flowing side og the separator as shown in FIG. 16. The coincidence of the positions of the grooves was also adopted in a cooling unit 35 shown in FIG. 16. The same configuration as Example 1 was adopted in the cooling unit.

As the result of the cell performance test of the laminated unit cells comprising 50 unit cells conducted under the same conditions as in Example 1, an output of 1050 W (34V–31A) was obtained.

As described previously, when the gas-distributing grooves were formed on both the surfaces of a single metallic plate, since the linear concave parts which separate the adjacent gas-distributing grooves at the hydrogen flowing side served as the gas-distributing grooves at the air flowing side. Thereby, the single plate could be shared in its thickness direction by both the grooves at the hydrogen flowing side and the air flowing side. And, it was possible to make the thickness of the one separator very thin. By setting the depth of the grooves to 0.8 mm and the thickness of the plate to 0.3 mm, a separator of the thickness of 1.1 mm was realized.

In addition, different materials may be used for configuring the convex parts of a non metallic material for forming the gas-distributing grooves, the convex parts arranged around the circumferential part of the separator, and the convex parts for forming the sealing parts around the manifold ports. For instance, if there is a need to more accurately adjust the thickness for one cell, it is possible to configure the circumferential part of the separator with a phenolic resin and to configure the other parts where the sealing property is strictly required with a silicon rubber.

Further, although the SUS 316 is used for the metallic plate, it is also effective to use another metallic plate having a greater processability such as SUS 316L, SUS 304 or the like. As regards the durability which is a matter of concern, the obtained voltage drop of the laminated unit cells of 50 unit cells configured with the separators made of the SUS 316L was about 2 V after a continuous operation for 2000 hours.

According to the present invention, since the sealants which have to be provided previously between the separators can be omitted, it is possible to realize a reduction in the manufacturing cost. In addition, an electrode having the same size as that of the separator can be realized, thereby to contribute to the compactness. Further, the mechanical strength can be increased and the structure of the cell constituting unit such as end plate can be simplified.

In addition, according to the present invention, it is possible to provide a polymer electrolyte fuel cell having an improved gas-sealing property between the outer manifolds and the flanks of the laminated unit cells. Further, it is possible to realize a simplification in the assembling steps.

Moreover, according to the present invention, since a metallic separator made of stainless steel or the like can be used without any machine tool cutting, it is possible to greatly reduce the manufacturing cost at a mass-production. In addition, since the separator can be made thinner, it also contributes to realize the compactness of the laminated unit cells.

It is understood that various other modifications will be apparent to and can be readily made by those skilled in the art without departing from the scope and spirit of the invention. Accordingly, it is not intended that the scope of the claims appended hereto be construed as set forth herein, but rather that the claims be construed as encompassing all the features of patentable novelty that reside in the present invention, including all features that would be treated as equivalents thereof by those skilled in the art to which the invention pertains.

What is claimed is:

1. A solid polymer electrolyte fuel cell comprising a plurality of stacked unit cells, each two unit cells having an electrically conductive separator disposed therebetween, said unit cell comprising:
   a pair of electrodes each of which comprises a catalytic reaction layer, said pair of electrodes having a solid polymer electrolyte film disposed therebetween,
   a means for supplying and distributing a fuel gas mixture containing hydrogen to one surface of said pair of electrodes, and a means for supplying and distributing an oxidant gas containing oxygen to another surface of said pair of electrodes,
   wherein a gas-tight electrically insulating layer is provided on the flank of the stacked unit cell and in between the stacked unit cells, thereby to give a gas-tightness between said electrodes and said separator, said insulating layers covering outside end portions of said separators, each of said gas-tight insulating layers formed on the flank and in between the stacked unit cells being a unitary layer.

2. The solid polymer electrolyte fuel cell in accordance with claim 1, wherein said electrically insulating layers comprise a composite material configured with an electrically insulating material and a material having a larger tensile strength than said insulating material.

3. The solid polymer electrolyte fuel cell in accordance with claim 1, wherein a gas manifold is provided on the flanks of said stacked unit cells via said electrically insulating layer, thereby to supply and distribute the fuel gas to the module.

4. The solid polymer electrolyte fuel cell in accordance with claim 1, wherein said gas manifold is composed of an elastic material.

5. The solid polymer electrolyte fuel cell in accordance with claim 3, wherein said gas manifold is composed of the same material as that of said electrically insulating layers.

6. The solid polymer electrolyte fuel cell in accordance with claim 5, wherein said electrically insulating layers comprises a resin or a rubber.

7. The solid polymer electrolyte fuel cell in accordance with claim 1, wherein each edge of the electrodes of said unit cells reach the flanks of the stacked unit cells.

8. The solid polymer electrolyte fuel cell in accordance with claim 1, wherein said separator is composed of a metallic plate having a gas-distributing groove and said gas-distributing groove is connected to the means for supplying and distributing said fuel gas by a gas-tight non-metallic material.

9. The solid polymer electrolyte fuel cell in accordance with claim 8, wherein said gas-distributing groove is composed of a plurality of linear grooves disposed in parallel with each other.

10. The solid polymer electrolyte fuel cell in accordance with claim 9, wherein said gas-distributing groove on one surface of the metallic plate forms a concave portion for a gas-distributing groove on the other surface of said metallic plate.

11. The solid polymer electrolyte fuel cell in accordance with claim 8, wherein said separator is composed of a plurality of metallic plates and a gas-distributing groove is provided on the entire surface of at least one of the metallic plates.

12. The solid polymer electrolyte fuel cell in accordance with claim 8, wherein the surfaces of the metallic plate in contact with the gas-tight non-metallic material have a gas-tightness to said fuel gas when said gas-tight non-metallic material is pressed against the metallic plate with a pressure of not less than a given value.

13. The solid polymer electrolyte fuel cell in accordance with claim 1, wherein said fuel cell further comprises a polyethylene terphthalate member disposed between an outside edge of each of said electrodes and said insulating layer formed on said flank.

14. A method for producing a solid polymer electrolyte fuel cell comprising a plurality of stacked unit cells each two unit cells having an electrically conductive separator disposed therebetween, said unit cell comprising a pair of electrodes each of which comprises a catalytic reaction layer, said pair of electrodes having a solid polymer electrolyte film disposed therebetween, a means for supplying and distributing a fuel gas mixture containing hydrogen to one surface of said pair of electrodes, and a means for supplying and distributing an oxidant gas containing oxygen to another surface of said pair of electrodes, comprising the steps of:
   stacking a plurality of the unit cells via separators disposed therebetween and mechanically fixing the plurality of the unit cells from both ends to produce the stacked unit cells,
   forming sealing portions comprising a gas-tight and electrically insulating material and a material having a larger tensile strength than said electrically insulating material on the flanks of said stacked unit cells, and
   providing gas manifolds on said stacked unit cells via the sealing portions to join said sealing portions on said manifolds gas-tightly.

15. The method for producing a solid polymer electrolyte fuel cell in accordance with claim 14, wherein said sealing portions are on the gas manifolds by means of ultrasonic welding.

16. The method for producing a solid polymer electrolyte fuel cell in accordance with claim 14, wherein, said gas manifolds are provided on the stacked unit cells via the sealing portions to join said sealing portions on said manifolds gas-tightly by molding said stacked unit cells and said gas manifold into an integral body by means of injection molding process.

17. The method of producing a solid polymer electrolyte fuel cell in accordance with claim 14, wherein said insulating material comprises a resin compound having a sufficiently low viscosity such that said resin compound forms a gas seal between said electrodes and said separators.

18. A solid polymer electrolyte fuel cell comprising a plurality of stacked unit cells, each two unit cells having an electrically conductive separator disposed therebetween, said unit cell comprising:
   a pair of electrodes each of which comprises a catalytic reaction layer, said pair of electrodes having a solid polymer electrolyte film disposed therebetween, a first manifold for supplying and distributing a fuel gas mixture containing hydrogen to one surface of said pair of electrodes via a plurality of first gas flow paths, each of said first gas flow paths having an input port, and a second manifold for supplying and distributing an oxidant gas containing oxygen to another surface of said pair of electrodes via a plurality of second gas flow paths, each of said second gas flow paths having an input port, wherein gas-tight electrically insulating layers are provided on the flanks and the insides of the stacked unit cells, thereby to give a gas-tightness between said electrodes and said separator, said insulating layers covering outside end portions of said separators, and surfaces of said first manifold and said second manifold without covering said input ports of said first and second gas flow paths.

19. The solid polymer electrolyte fuel cell in accordance with claim 18, wherein each of electrodes and said separator have the same width.

20. The solid polymer electrolyte fuel cell in accordance with claim 18, wherein said fuel cell further comprises a polyethylene terphthalate member disposed between an outside edge of each of said electrodes and said insulating layer formed on said flank.

21. The solid polymer electrolyte fuel cell in accordance with claim 18, wherein said insulating layers disposed on said flanks comprise a composite material including an insulating material and a material having a larger tensile strength than said insulating material.

22. A solid polymer electrolyte fuel cell comprising a plurality of stacked unit cells, each two unit cells having an electrically conductive separator disposed therebetween, said unit cell comprising:

a pair of electrodes each of which comprises a catalytic reaction layer, said pair of electrodes having a solid polymer electrolyte film disposed therebetween, a first manifold for supplying and distributing a fuel gas mixture containing hydrogen to one surface of said pair of electrodes via a plurality of first gas flow paths, each of said first gas flow paths having an input port, and a second manifold for supplying and distributing an oxidant gas containing oxygen to another surface of said pair of electrodes via a plurality of second gas flow paths, each of said second gas flow paths having an input port, wherein a gas-tight electrically insulating layer is provided on the flank and in between the stacked unit cells, thereby to give a gas-tightness between said electrodes and said separator, said insulating layers covering outside end portions of said separators, said insulating layers having a concentration and viscosity such that said insulating layers do not block said input ports of said first and second gas flow paths.

23. A solid polymer electrolyte fuel cell comprising a plurality of stacked unit cells, each two unit cells having an electrically conductive separator disposed therebetween, said unit cell comprising:

a pair of electrodes each of which comprises a catalytic reaction layer, said pair of electrodes having a solid polymer electrolyte film disposed therebetween, a means for supplying and distributing a fuel gas mixture containing hydrogen to one surface of said pair of electrodes, and a means for supplying and distributing an oxidant gas containing oxygen to another surface of said pair of electrodes, wherein a gas-tight electrically insulating layer is provided on the flank and in between the stacked unit cells, thereby to give a gas-tightness between said electrodes and said separator, said insulating layers covering outside end portions of said separators, said insulating layers having a concentration and viscosity such that said insulating layers fills voids between said electrodes and said separator.

* * * * *